US012675282B2

(12) United States Patent
Sanada et al.

(10) Patent No.: US 12,675,282 B2
(45) Date of Patent: Jul. 7, 2026

(54) VEHICLE CONTROL APPARATUS

(71) Applicant: Mitsubishi Electric Corporation, Tokyo (JP)

(72) Inventors: Akihiro Sanada, Tokyo (JP); Nozomi Yamada, Tokyo (JP); Takuya Kono, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 200 days.

(21) Appl. No.: 18/695,830

(22) PCT Filed: Nov. 16, 2021

(86) PCT No.: PCT/JP2021/042001
§ 371 (c)(1),
(2) Date: Mar. 27, 2024

(87) PCT Pub. No.: WO2023/089652
PCT Pub. Date: May 25, 2023

(65) Prior Publication Data
US 2024/0394037 A1     Nov. 28, 2024

(51) Int. Cl.
*G06F 8/65* (2018.01)
*B60L 3/00* (2019.01)
(Continued)

(52) U.S. Cl.
CPC .............. *G06F 8/65* (2013.01); *B60R 16/033* (2013.01); *G07C 5/0808* (2013.01)

(58) Field of Classification Search
CPC ... G06F 8/65; G06F 8/654; G06F 1/26; G06F 8/60; B60R 16/033; G07C 5/0808;
(Continued)

(56) References Cited

U.S. PATENT DOCUMENTS 5,293,076 A     3/1994 Fukui
11,283,601 B2 *  3/2022 Haga ......................... G06F 8/65
(Continued)

FOREIGN PATENT DOCUMENTS

DE          42 12 819 A1   10/1992
DE     10 2005 031 254 A1   1/2007
(Continued)

OTHER PUBLICATIONS

Office Action issued Dec. 5, 2024 in German Patent Application No. 11 2021 008 457.7, 10 pages.
(Continued)

*Primary Examiner* — Thuy Dao
(74) *Attorney, Agent, or Firm* — XSENSUS LLP

(57)     ABSTRACT

In the present disclosure, after starting software updating, a power-source remaining capacity decreasing amount is detected and then it is determined whether or not the software updating can be continued, so that high-stability software updating can be performed. A vehicle control apparatus includes a storage apparatus in which software has been written, a reception unit that receives updating software, a power-source-remaining-capacity detection unit, a power-source-remaining-capacity decrease detection unit, a software-updating-power calculation unit, a software-updating-starting permission unit, a software-updating-continuation permission unit, and a software-updating control unit; in the case where a power-source remaining capacity decreasing amount of a battery is smaller than a predetermined decrease determination value, the vehicle control apparatus permits continuation of software updating.

16 Claims, 15 Drawing Sheets

(51) Int. Cl.

| | |
|---|---|
| *B60R 16/023* | (2006.01) |
| *B60R 16/033* | (2006.01) |
| *G06F 21/62* | (2013.01) |
| *G07C 5/08* | (2006.01) |
| *H04L 29/06* | (2006.01) |
| *H04L 29/08* | (2006.01) |
| *H04L 67/12* | (2022.01) |

(58) Field of Classification Search
CPC ......... B60W 50/06; H04W 4/40; H04W 4/44;
B60L 58/12; B60L 50/60; B60L 53/305;
B60L 53/68
See application file for complete search history.

(56) References Cited

U.S. PATENT DOCUMENTS

| | | | | |
|---|---|---|---|---|
| 11,797,290 B2 * | 10/2023 | Iwata | ...................... | B60L 53/67 |
| 2019/0250903 A1 | 8/2019 | Seki | | |
| 2020/0215930 A1 | 7/2020 | Izumi | | |

FOREIGN PATENT DOCUMENTS

| | | | |
|---|---|---|---|
| DE | 11 2017 005 433 T5 | 7/2019 | |
| DE | 11 2018 004 053 T5 | 4/2020 | |
| JP | 5699893 B2 | 4/2015 | |

OTHER PUBLICATIONS

International Search Report and Written Opinion received for PCT Patent Application No. PCT/JP2021/042001, mailed on Feb. 1, 2022, 8 pages.

* cited by examiner

VEHICLE CONTROL APPARATUS

CROSS-REFERENCE TO RELATED APPLICATION

This application is based on PCT filing PCT/JP2021/042001, filed Nov. 16, 2021, the entire contents of which are incorporated herein by reference.

TECHNICAL FIELD

The present disclosure relates to a vehicle control apparatus.

BACKGROUND ART

In recent years, in the automobile industry, adoption of software updating for a vehicle control apparatus has started. From the outside, a vehicle control apparatus receives data for updating software; then, rewriting of the software in a storage apparatus that stores the software is performed.

A technology for stably updating software for a vehicle control apparatus has been proposed. There has been proposed a software updating method in which after power-source remaining capacity of a battery that supplies a power source to a vehicle control apparatus is ascertained so as to determine whether or not software updating can be performed, the software updating is executed (e.g., Patent Document 1).

CITATION LIST

Patent Literature

Patent Document 1: Japanese Patent No. 5699893

SUMMARY OF INVENTION

Technical Problem

In the technology disclosed in Patent Document 1, when software for a vehicle control apparatus is updated, remaining capacity of the operational power source (battery) of a vehicle is obtained. Only when the power-source remaining capacity is larger than power consumption necessary for updating software, i.e., a specified value, the software is updated. Through the foregoing method, it can be prevented that software updating is interrupted due to lack of power-source capacity during the software updating. As a result, software updating can be performed in a stable environment.

However, the technology disclosed in Patent Document 1 cannot cope with the case where during software updating, power-source remaining capacity rapidly decreases. Moreover, in calculation of power-source remaining capacity, deterioration in the battery performance, charging-state difference among vehicles, and the like cause an error. Accordingly, even when under the assumption that sufficient power-source remaining capacity for software updating is secured, the software updating is performed, there is presumed the case where the software updating cannot be completed.

The present disclosure has been implemented in order to solve the foregoing problems; the objective thereof is to obtain a vehicle control apparatus that detects power-source remaining capacity when software for a vehicle control apparatus mounted in a vehicle is updated and starts the updating of the software in the case where the power-source remaining capacity is larger than software-updating electric power, that detects a decreasing amount of the power-source remaining capacity after the software updating has been started and determines whether or not the software updating can be continued, and then that makes it possible to perform high-stability software updating.

Solution to Problem

A vehicle control apparatus to the present disclosure includes
a storage apparatus in which software has been written,
a reception unit that receives updating software for updating the software,
a power-source-remaining-capacity detection unit that detects power-source remaining capacity of a battery,
a power-source-remaining-capacity decrease detection unit that detects a power-source remaining capacity decreasing amount of a battery,
a software-updating-power calculation unit that calculates software-updating electric power for writing the updating software in the storage apparatus,
a software-updating-starting permission unit that permits starting of updating the software in the case where remaining capacity of the battery detected by the power-source-remaining-capacity detection unit is larger than the software-updating electric power calculated by the software-updating-power calculation unit,
a software-updating-continuation permission unit that permits continuation of updating the software in the case where a power-source remaining capacity decreasing amount of the battery is smaller than a predetermined decrease determination value, and
a software-updating control unit that starts writing the updating software in the storage apparatus in the case where the software-updating-starting permission unit permits starting of software updating, that continues writing the updating software in the storage apparatus in the case where during writing the updating software in the storage apparatus, the software-updating-continuation permission unit permits continuation of software updating, and that interrupts writing the updating software in the storage apparatus in the case where the software-updating-starting permission unit or the software-updating-continuation permission unit determines not to provide permission.

Advantageous Effects of Invention

In the case where software for a vehicle control apparatus mounted in a vehicle is updated, a vehicle control apparatus according to the present disclosure detects battery remaining capacity and starts updating of the software in the case where the battery remaining capacity is larger than software-updating electric power, and then detects a decreasing amount of the power-source remaining capacity, after the software updating has been started, so as to determine whether or not the software updating can be continued, so that high-stability software updating can be performed.

DESCRIPTION OF EMBODIMENTS

Hereinafter, respective vehicle control apparatuses according to Embodiments of the present disclosure will be explained with reference to the drawings.

1. Embodiment 1

<Configuration of Vehicle Control Apparatus>

Figure 1:
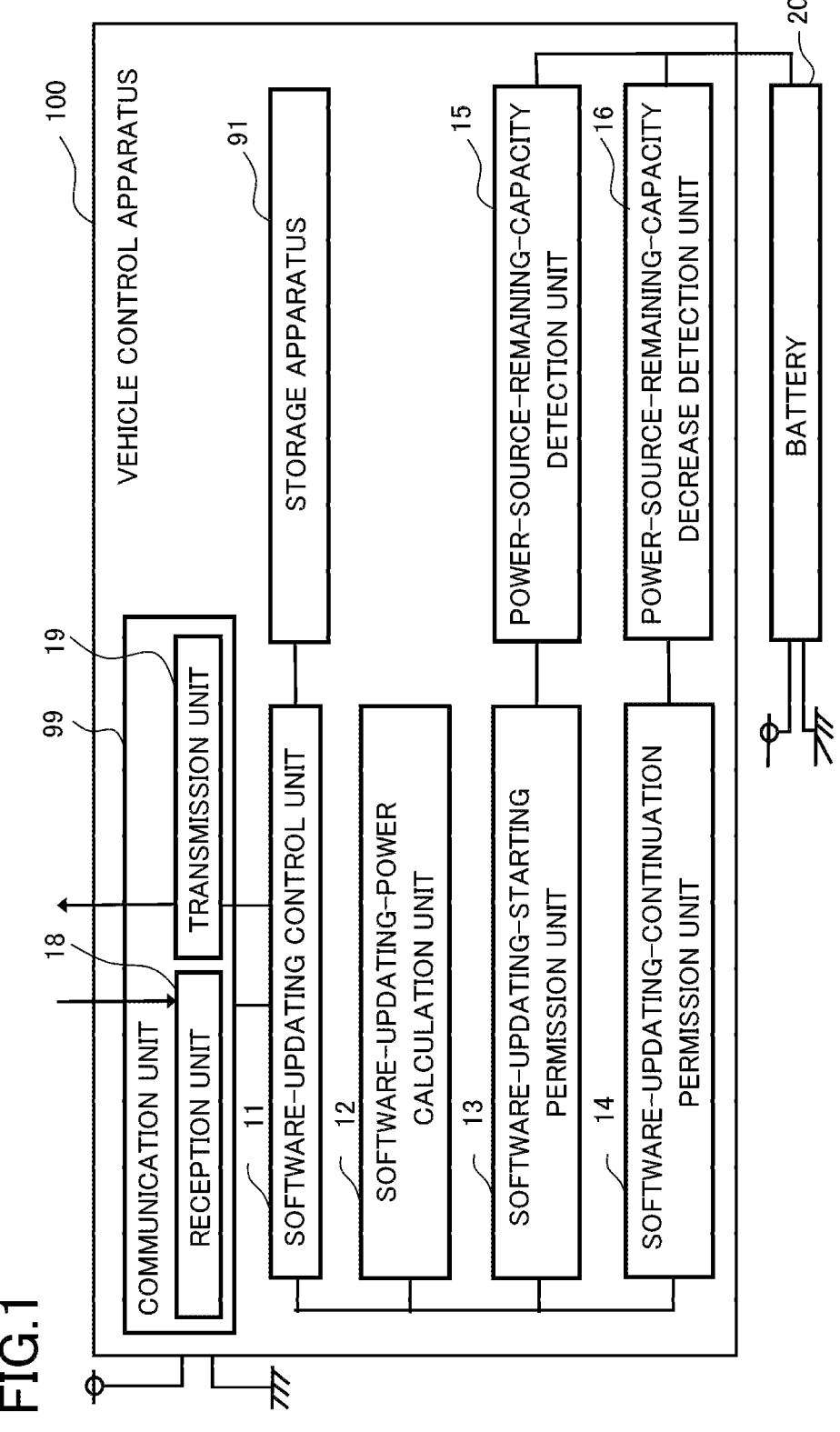
FIG. 1 is a configuration diagram of a vehicle control apparatus according to Embodiment 1.

FIG. 1 is a configuration diagram of a vehicle control apparatus 100 according to Embodiment 1. The vehicle control apparatus 100 includes a communication unit 99, a software-updating control unit 11, a software-updating-power calculation unit 12, a software-updating-starting permission unit 13, a software-updating-continuation permission unit 14, a power-source-remaining-capacity detection unit 15, and a power-source-remaining-capacity decrease detection unit 16, and is connected with a battery 20.

The vehicle control apparatus 100 has a storage apparatus 91 that stores software to be executed by a computing processing unit. In this situation, the computing processing unit may undertake all of information processing items by the vehicle control apparatus 100; however, respective computing processing units dedicated to specific control items such as engine control, traveling control and braking control may be provided.

FIG. 1 represents an example in which the storage apparatus 91 is provided inside the vehicle control apparatus 100. However, the storage apparatus 91 may be included in an independent control apparatus provided outside the vehicle control apparatus 100. Moreover, it may be allowed that two or more storage apparatuses 91 are provided along with a computing processing unit and are connected with the vehicle control apparatus 100.

<Reception of the Latest Software>

The communication unit 99 of the vehicle control apparatus 100 has a reception unit 18 and a transmission unit 19 and communicates with the outside so as to receive data for updating software. The communication subject of the communication unit 99 may be another control apparatus inside the vehicle, a reprogramming apparatus temporarily connected with a diagnosis connector of the vehicle, or an external server that can communicate with the communication unit 99 via a wide area communication network.

In the present embodiment, there will be explained the case where the vehicle control apparatus 100 communicates with an external server (unillustrated). The server transmits data related to updating software for software written in the storage apparatus 91 of the vehicle control apparatus 100. The software-updating control unit 11 controls writing of updating software, received by the reception unit 18 in the communication unit 99 of the vehicle control apparatus 100, in the storage apparatus 91.

When the software stored in the storage apparatus 91 is updated, it is ascertained whether or not rewriting of the software can be completed, and then the rewriting is performed. In some cases, the power-source remaining capacity of the battery 20 that supplies electric power to the vehicle control apparatus 100 is depleted. In such a case, it is presumed that the voltage of the battery 20 decreases during rewriting of the software and hence the operation of the becomes unstable. In that case, it is also conceivable that the software being rewritten in the storage apparatus 91 causes abnormal operation.

It can be presumed that even when it is determined that the power-source remaining capacity of the battery 20 is sufficient and the rewriting of the software is started, a problem occurs. In some cases, there exists a case where due to a contributing factor such as deterioration in the battery 20, an increase in the power consumption in the vehicle, or the like, the power-source remaining capacity of the battery 20 rapidly decreases. Moreover, there may exist a case where detection or calculation of the initial power-source remaining capacity of the battery 20 is inaccurate and hence the actual power-source remaining capacity is smaller than the power-source remaining capacity recognized by the vehicle control apparatus 100.

Accordingly, during the rewriting of the software, the decreasing amount of the remaining capacity of the battery 20 is detected so as to determine whether or not the updating of the software should be continued. In the case where it is determined that the power-source remaining capacity of the battery 20 is not sufficient, it is made possible that the rewriting of the software is interrupted before the voltage of the battery 20 decreases and hence the vehicle control apparatus 100 malfunctions, and the interruption of the software updating is notified to the server.

Moreover, appropriate measures can be taken, such as stopping the execution of software being updated in the vehicle control apparatus 100 or switching it to the execution of software in a backup storage apparatus. Through the foregoing method, when the power-source remaining capacity of the battery 20 revives, software updating can be performed again; thus, the conventional vehicle control apparatus 100 can be prevented from abnormally operating and hence high-stable software updating becomes possible.

It may be allowed that it is adopted as a precondition for software updating that the ignition switch of a vehicle has been turned off. The reason therefor is that because the vehicle is stopped, advantages that power-source-voltage fluctuation caused by the motion of the vehicle, noise generation by a change in the environmental situation of the vehicle, and the like can be suppressed are conceivable. However, it may be allowed that without adopting it, as the precondition, that the ignition switch is turned off, software updating is permitted during travel of the vehicle. There exists an advantage that the opportunity for software updating can be expanded.

<Calculation of Software-Updating Electric Power>

The reception unit 18 of the vehicle control apparatus 100 receives updating software from the server. For this updating software, the software-updating-power calculation unit 12 calculates software-updating electric power EPrv, which is the output necessary for executing rewriting in the storage apparatus. Unless the software-updating electric power EPrv can be secured, rewriting of the updating software cannot be completed.

<Detection of Power-Source Remaining Capacity>

The battery 20 provided in the vehicle supplies electric power to the vehicle control apparatus 100 and various apparatuses inside the vehicle. The power-source-remaining-capacity detection unit 15 connected with the battery 20 detects power-source remaining capacity EPr of the battery.

With regard to the detection of the power-source remaining capacity of the battery 20, in the case where the initial electric-power capacity of the battery is comprehended, it is assumed that the battery has this initial-value electric-power capacity at a time of full charging; the voltage of and the current in the power-source line are measured and then the discharging amount (electric-power usage amount) and the charging amount are accumulated, so that the present power-source remaining capacity can be calculated. In addition, it may be allowed to correct the power-source remaining capacity calculated in the foregoing manner, by use of a value such as a power-source voltage Vb or a power-source-voltage decreasing amount ΔVb obtained by measuring the voltage, a CCA rate obtained by comparing the initial value with a CCA (Cold Cranking Ampere) obtained with a measurement device, a battery-liquid specific gravity SG (Specific Gravity) obtained with a measurement device, or the like.

<Software-Updating Starting Permission>

The software-updating-starting permission unit 13 compares the power-source remaining capacity EPr detected by the power-source-remaining-capacity detection unit 15 with the software-updating electric power EPrv calculated by the software-updating-power calculation unit 12. In the case where the power-source remaining capacity EPr is larger than the software-updating electric power EPrv, the software-updating-starting permission unit 13 permits starting of software updating.

In the case where the power-source remaining capacity EPr is the same as or smaller than the software-updating electric power EPrv, the software-updating-starting permission unit 13 does not permit starting of software updating. When the software-updating-starting permission unit 13 does not permit starting of software updating, the software-updating control unit 11 cannot start rewriting of software in the storage apparatus 91.

<Detection of Power-Source Remaining Capacity Decreasing Amount>

The power-source-remaining-capacity detection unit 16 connected with the battery 20 detects a power-source remaining capacity decreasing amount ΔEPr of the battery 20. In some cases, the capacity of the battery 20 rapidly decreases due to any one of various contributing factors such as aging degradation, adhesion of electrolytic material to an electrode, and rapid increase in the power consumption of the vehicle. The power-source-remaining-capacity decrease detection unit 16 detects the power-source remaining capacity decreasing amount ΔEPr at a time when such a case occurs so as to make it possible to cope with an unexpected change in the state of the battery 20.

The power-source remaining capacity decreasing amount ΔEPr of the battery 20 can be calculated from a variation value of the power-source remaining capacity, obtained by accumulating the discharging amount (electric-power usage amount) and the charging amount. In addition, it may be allowed to obtain the power-source remaining capacity decreasing amount ΔEPr, by use of a value such as the power-source voltage Vb or the power-source-voltage decreasing amount ΔVb obtained by measuring the voltage, the CCA rate Rcca obtained by comparing the initial value with the CCA (Cold Cranking Ampere) obtained with a measurement device, a CCA rate decreasing amount ΔRcca, which is a variation value of the CCA rate, the battery-liquid specific gravity SG obtained with a measurement device, a battery-liquid specific gravity decreasing amount ΔSG, or the like.

<Software-Updating Continuation Permission>

The software-updating-continuation permission unit 14 compares the power-source remaining capacity decreasing amount ΔEPr, detected by the power-source-remaining-capacity decrease detection unit 16, with a predetermined decrease determination value ΔEPj. In the case where the power-source remaining capacity decreasing amount ΔEPr is the same as or smaller than the decrease determination value ΔEPj, the software-updating-continuation permission unit 14 determines that the power-source remaining capacity of the battery 20 can be maintained until completion of software updating and then permits continuation of software rewriting.

In the case where the power-source remaining capacity decreasing amount ΔEPr is larger than the decrease determination value ΔEPj, the software-updating-continuation permission unit 14 determines that the power-source remaining capacity of the battery 20 may not be maintained until completion of software updating and does not permit continuation of software rewriting. When the software-updating-starting permission unit 14 does not permit continuation of software updating, the software-updating control unit 11 cannot continue rewriting of software in the storage apparatus 91.

<Hardware Configuration of Vehicle Control Apparatus>

Figure 2:
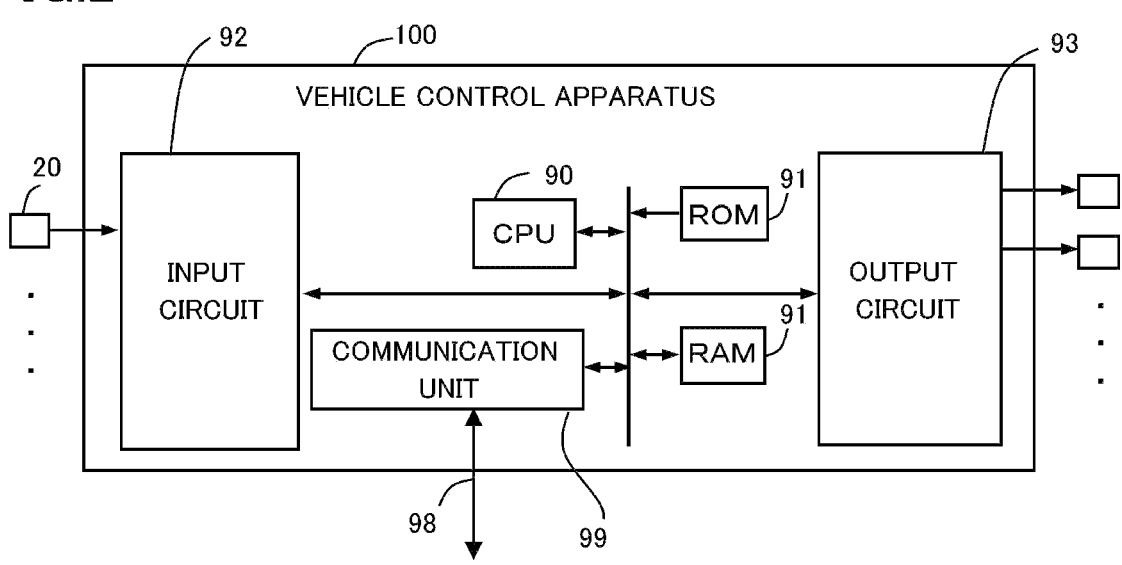
FIG. 2 is a hardware configuration diagram of the vehicle control apparatus according to Embodiment 1.

FIG. 2 is a hardware configuration diagram of the vehicle control apparatus 100 according to Embodiment 1. Respective functions of the vehicle control apparatus 100 are realized by processing circuits provided in the vehicle control apparatus 100. Specifically, as illustrated in FIG. 2, the vehicle control apparatus 100 includes, as processing circuits, a computing processing unit (computer) 90 such as a CPU (Central Processing Unit), the storage apparatuses 91 that exchange data with the computing processing unit 90, an input circuit 92 that inputs external signals to the computing processing unit 90, an output circuit 93 that outputs signals from the computing processing unit 90 to the outside, and an interface, such as the communication unit 99, that transmits or receives data via a communication path 98.

It may be allowed that as the computing processing unit 90, an ASIC (Application Specific Integrated Circuit), an IC (Integrated Circuit), a DSP (Digital Signal Processor), an FPGA (Field Programmable Gate Array), any one of various kinds of logic circuits, any one of various kinds of signal processing circuits, or the like is provided. The SoC (System on a Chip) technology may be applied to the computing processing unit 90. In addition, it may be allowed that as the computing processing unit 90, two or more computing processing units of the same type or different types are provided and respective processing items are executed in a sharing manner. In the vehicle control apparatus 100, as the storage apparatuses 91, there are provided a RAM (Random Access Memory) that can read data from and write data in the computing processing unit 90, a ROM (Read Only Memory) that can read data from the computing processing unit 90, and the like. The storage apparatuses 91 may be incorporated in the computing processing unit 90. The input circuit 92 is connected with an input signal, a sensor, and a switch and is provided with an A/D converter and the like for inputting the input signal and signals from the sensor and the switch to the computing processing unit 90. The output circuit 93 is connected with electric loads such as a gate driving circuit for on/off-driving switching devices and the like, and is provided with a driving circuit and the like for outputting control signals from the computing processing unit 90 to these electric loads. Via the communication path 98, the communication unit 99 can exchange data with an external apparatus such as an external control apparatus.

The computing processing unit 90 runs software items (programs) stored in the storage apparatus 91 such as a ROM and collaborates with other hardware devices in the vehicle control apparatus 100, such as the storage apparatus 91, the input circuit 92, and the output circuit 93, so that the respective functions provided in the vehicle control apparatus 100 are realized. In addition, setting data items such as a threshold value and a determination value to be utilized in the vehicle control apparatus 100 are stored, as part of software items (programs), in the storage apparatus 91 such as a ROM. It may be allowed that the respective functions included in the vehicle control apparatus 100 are configured with either software modules or combinations of software and hardware.

<Software-Updating Starting Processing>

Figure 3:
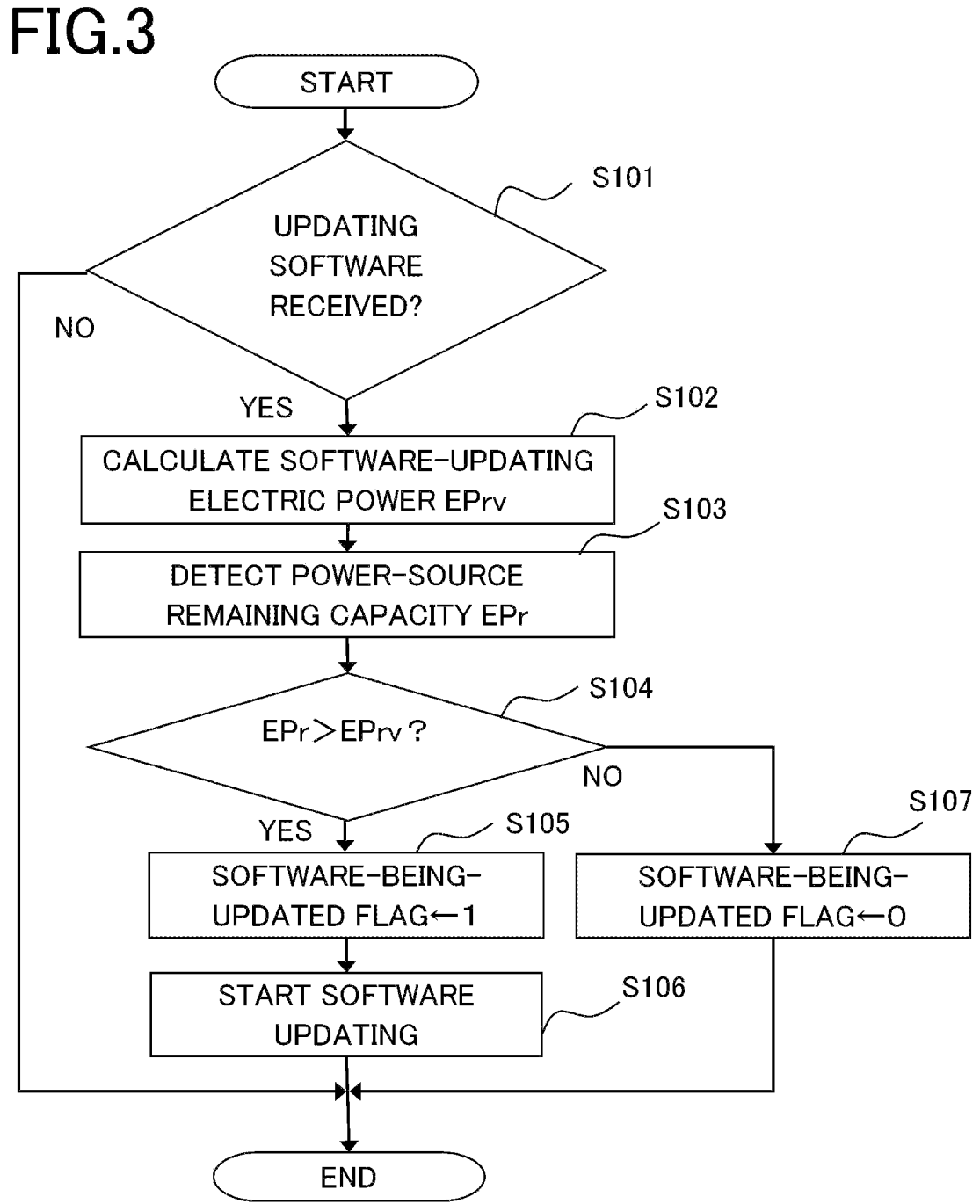
FIG. 3 is a flowchart representing software-updating starting processing by the vehicle control apparatus according to Embodiment 1.

FIG. 3 is a flowchart representing software-updating starting processing by the vehicle control apparatus 100 according to Embodiment 1. In the flowchart in FIG. 3, the flow in which respective function blocks of the vehicle control apparatus 100 operate will be explained.

The processing in the flowchart in FIG. 3 is performed every predetermined time (for example, every 10 ms). The processing represented in FIG. 3 may be performed not every predetermined time but every event, for example, each time the vehicle has traveled a predetermined distance or each time the vehicle control apparatus 100 has received data from the server.

After the processing is started, it is determined in the step S101 whether or not the reception unit 18 has received updating software from the server. In the case where the reception unit 18 has not received updating software (the determination result is NO), the processing is ended. In the case where the reception unit 18 has received updating software (the determination result is YES), the step S101 is followed by the step S102.

In the step S102, for the updating software, the software-updating-power calculation unit 12 calculates the software-updating electric power EPrv necessary for executing rewriting in the storage apparatus. Then, in the step S103, the power-source-remaining-capacity detection unit 15 detects the power-source remaining capacity EPr of the battery.

In the step S104, the software-updating-starting permission unit 13 determines whether or not the power-source remaining capacity EPr is larger than the software-updating electric power EPrv. In the case where the power-source remaining capacity EPr is the same as or smaller than the software-updating electric power EPrv (the determination result is NO), the step S104 is followed by the step S107. In the case where the power-source remaining capacity EPr is larger than the software-updating electric power EPrv (the determination result is YES), the step S104 is followed by the step S105. This is the case where the software-updating-starting permission unit 13 permits starting of software updating.

In the step S105, a software-being-updated flag is set. The software-being-updated flag is a flag indicating that rewriting software in the storage apparatus 91 is being executed at present. The software-being-updated flag is cleared, as an initial setting, for example, at a time when the vehicle control apparatus is started.

In the step S106, software updating is started. The software-updating control unit 11 starts rewriting of software in the storage apparatus 91. Then, the foregoing processing is ended.

The step S107 is the case where the software-updating-starting permission unit 13 does not permit starting of software updating; the software-being-updated flag is cleared therein. Then, the foregoing processing is ended.

<Software-Updating Continuation Processing>

Figure 4:
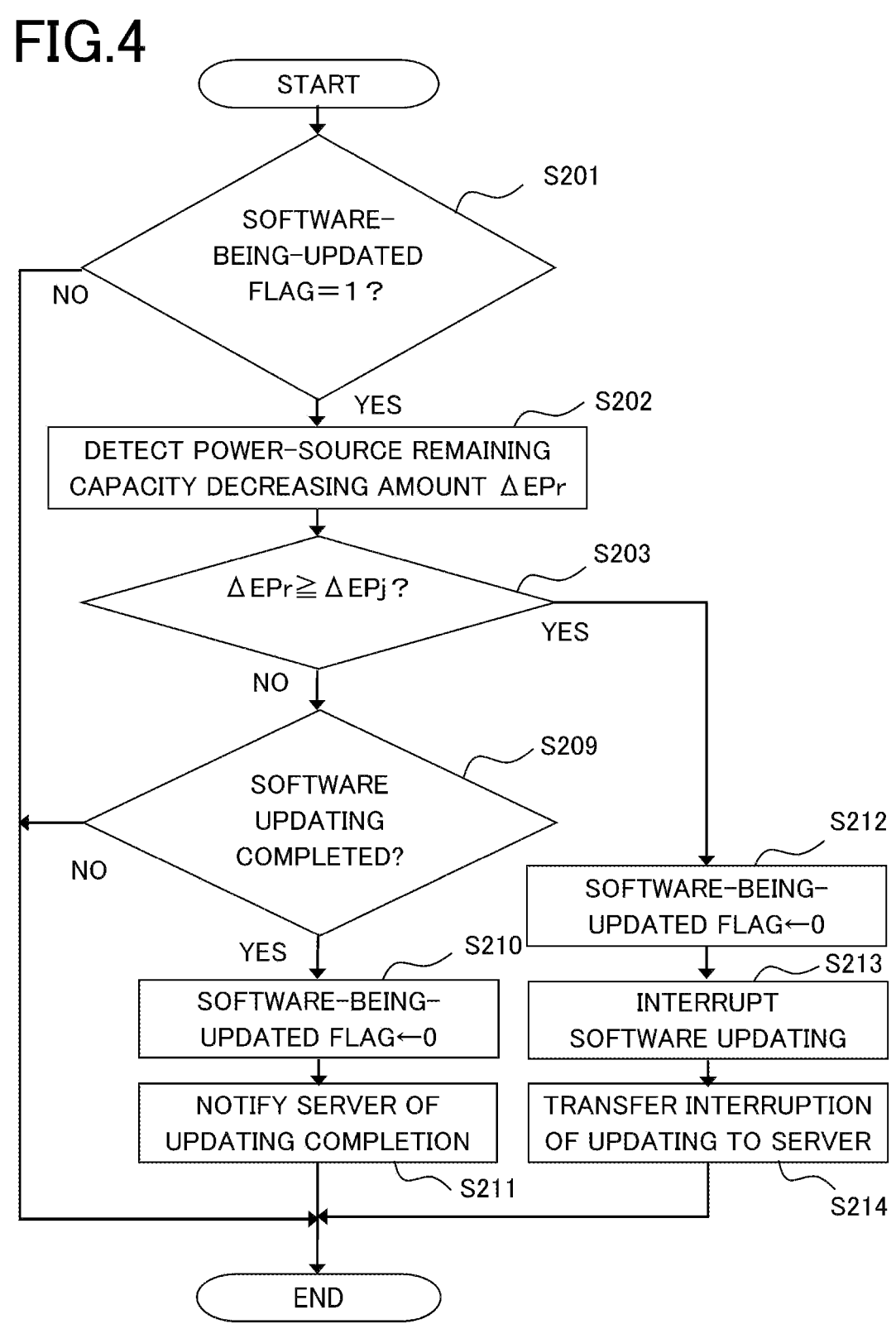
FIG. 4 is a flowchart representing software-updating continuation processing by the vehicle control apparatus according to Embodiment 1.

FIG. 4 is a flowchart representing software-updating continuation processing by the vehicle control apparatus 100 according to Embodiment 1. In the flowchart in FIG. 4, the flow in which respective function blocks of the vehicle control apparatus 100, which is performing software updating, operate will be explained.

The processing in the flowchart in FIG. 4 is performed every predetermined time (for example, every 10 ms or every 30 seconds). The processing in the flowchart in FIG. 4 may be performed not every predetermined time but every event, for example, each time the vehicle has traveled a predetermined distance.

In the step S201 after the start of the processing, it is determined whether or not the software-being-updated flag has been set. In the case where the software-being-updated flag has not been set (the determination result is NO), the processing is ended. In the case where the software-being-updated flag has been set (the determination result is YES), the step S201 is followed by the step S202.

In the step S202, the power-source-remaining-capacity decrease detection unit 16 detects the power-source remaining capacity decreasing amount ΔEPr. Then, in the step S203, it is determined whether or not the power-source remaining capacity decreasing amount ΔEPr detected by the power-source-remaining-capacity decrease detection unit 16 is the same as or larger than the predetermined decrease determination value ΔEPj. In the case where the power-source remaining capacity decreasing amount ΔEPr is the same as or larger than the decrease determination value ΔEPj (the determination result is YES), the step S203 is followed by the step S212. This is the case where the software-updating-continuation permission unit 14 does not permit continuation of software updating.

In the case where in the step S203, the power-source remaining capacity decreasing smaller than the decrease determination value ΔEPj (the determination result is NO), the step S203 is followed by the step S209. This is the case where the software-updating-continuation permission unit 14 permits continuation of software updating.

In the step S209, the software-updating control unit 11 determines whether or not the software updating has been completed. The software-updating control unit 11 determines whether or not rewriting the software in the storage apparatus 91 has been completed. In the case where the software updating has not been completed (the determination result is NO), the processing is ended. The software is being updated, and the software updating is continued as it is.

In the case where in the step S209, the software updating has been completed (the determination result is YES), the step S209 is followed by the step S210. In the step S210, the software-being-updated flag is cleared. Then, in the step S211, the transmission unit 19 is instructed to notify the server of the completion of the software updating.

In the step S212, the software-being-updated flag is cleared. Then, in the step S213, the software updating by the software-updating control unit 11 is interrupted. In the step S214, the transmission unit 19 is instructed to notify the server of the interruption of the software updating.

Because being configures in the foregoing manner, the vehicle control apparatus 100 according to Embodiment 1 can cope with the case where the capacity of the battery 20 rapidly decreases due to any one of various contributing factors such as aging degradation of the battery 20, adhesion of electrolytic material to an electrode, and rapid increase in the power consumption of the vehicle. Detection of the power-source remaining capacity decreasing amount ΔEPr at such a time makes it possible to appropriately cope with an unexpected change in the state of the battery 20. Accordingly, it is made possible to prevent the vehicle control apparatus 100 from abnormally operating and to perform high-stability software updating.

2. Embodiment 2

Because the configuration of the vehicle control apparatus 100 represented in FIG. 2 can directly be applied to a vehicle control apparatus according to Embodiment 2, the vehicle control apparatus according to Embodiment 2 will be explained by utilizing the reference numerals as they are. Although the vehicle control apparatus 100 according to Embodiment 2 can be realized only by changing software items, changing hardware items may be included.

The vehicle control apparatus 100 according to Embodiment 2 is different from the vehicle control apparatus 100 according to Embodiment 1 in that a determination by the software-updating-continuation permission unit 14 is added to the software-updating continuation processing. The software-updating-power calculation unit 12 calculates software-updating continuation power EPcrv, which is the electric power necessary for rewriting unwritten part of software. Then, the software-updating-continuation permission unit 14 corrects the software-updating continuation power EPcrv in accordance with the power-source remaining capacity decreasing amount ΔEPr and compares the corrected software-updating continuation power EPcrv with the power-source remaining capacity EPr. The softwareupdating-continuation permission unit 14 permits continuation of software updating only when the power-source remaining capacity EPr is larger than the corrected software-updating continuation power EPcrv.

<Software-Updating Continuation Permission>

The software-updating-continuation permission unit 14 compares the power-source remaining capacity decreasing amount ΔEPr, detected by the power-source-remaining-capacity decrease detection unit 16, with a predetermined decrease determination value ΔEPj. In the case where the power-source remaining capacity decreasing amount ΔEPr is larger than the decrease determination value ΔEPj, the software-updating-continuation permission unit 14 determines that the power-source remaining capacity of the battery 20 may not be maintained until completion of software updating and does not permit continuation of software rewriting.

Moreover, the software-updating-continuation permission unit 14 calculates the software-updating continuation power EPcrv. Then, the software-updating continuation power EPcrv is corrected in accordance with the power-source remaining capacity decreasing amount ΔEPr. In the case where the power-source remaining capacity decreasing amount ΔEPr is smaller than "0" (the power-source remaining capacity has not decreased), the software-updating continuation power EPcrv is not corrected but utilized as it is.

In the case where the power-source remaining capacity decreasing amount ΔEPr is the same as or larger than "0" (the power-source remaining capacity has decreased), the power-source remaining capacity decreasing amount ΔEPr is compared with the predetermined decrease determination value ΔEPj. In the case where power-source remaining capacity decreasing amount ΔEPr is the same as or smaller than the decrease determination value ΔEPj, the software-updating continuation power EPcrv is increased by a function corresponding to the power-source remaining capacity decreasing amount ΔEPr. In the case where power-source remaining capacity decreasing amount ΔEPr is larger than the decrease determination value ΔEPj, the software-updating continuation power EPcrv is increased by being multiplied by a predetermined power-source remaining capacity decreasing-timing increasing rate GEP.

Then, in the case where the power-source remaining capacity EPr is larger than the corrected or uncorrected software-updating continuation power EPcrv, the software-updating-continuation permission unit 14 permits continuation of software rewriting.

<Software-Updating Continuation Processing>

Figure 5:
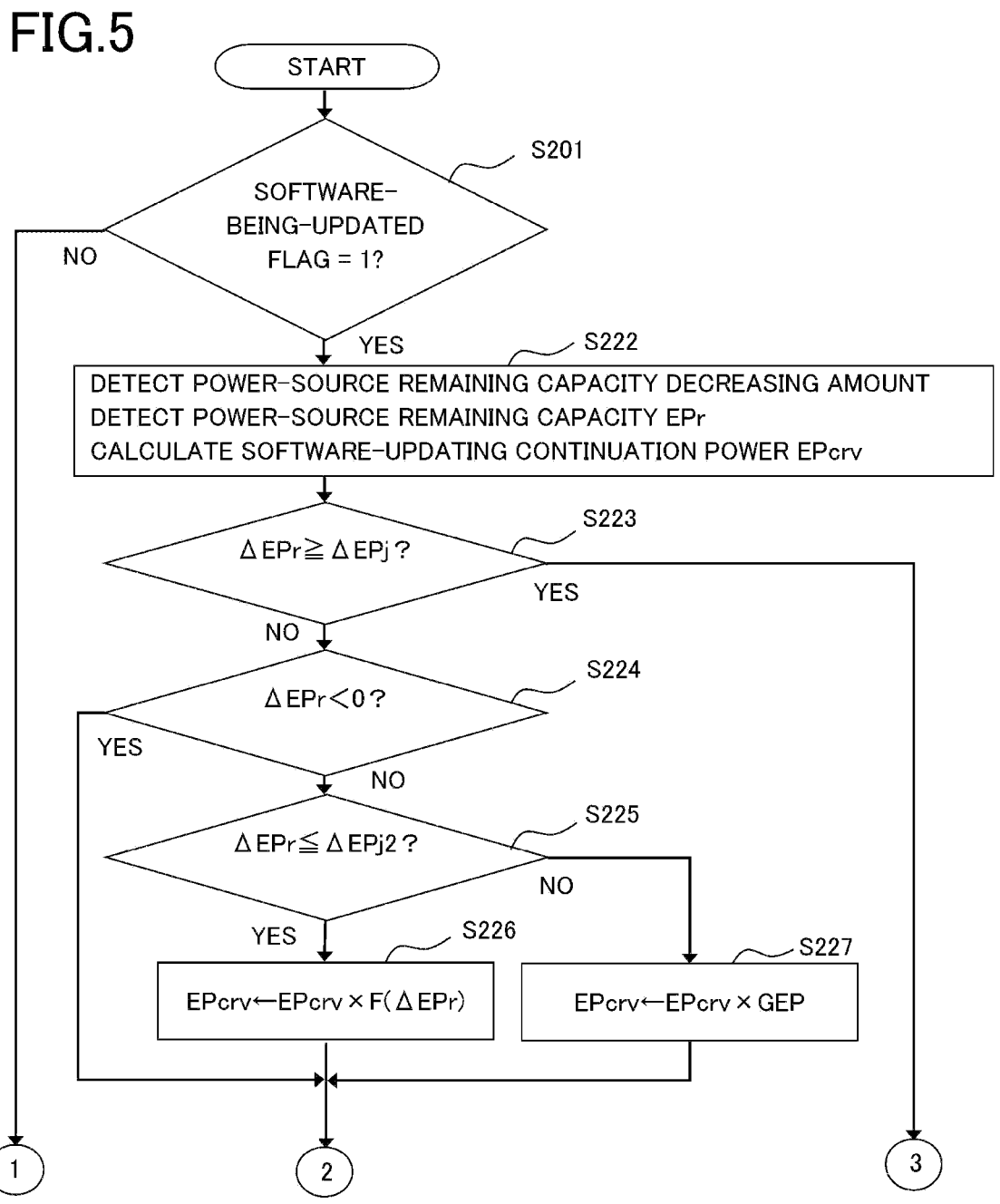
FIG. 5 is a first flowchart representing software-updating continuation processing by a vehicle control apparatus according to Embodiment 2.
Figure 6:
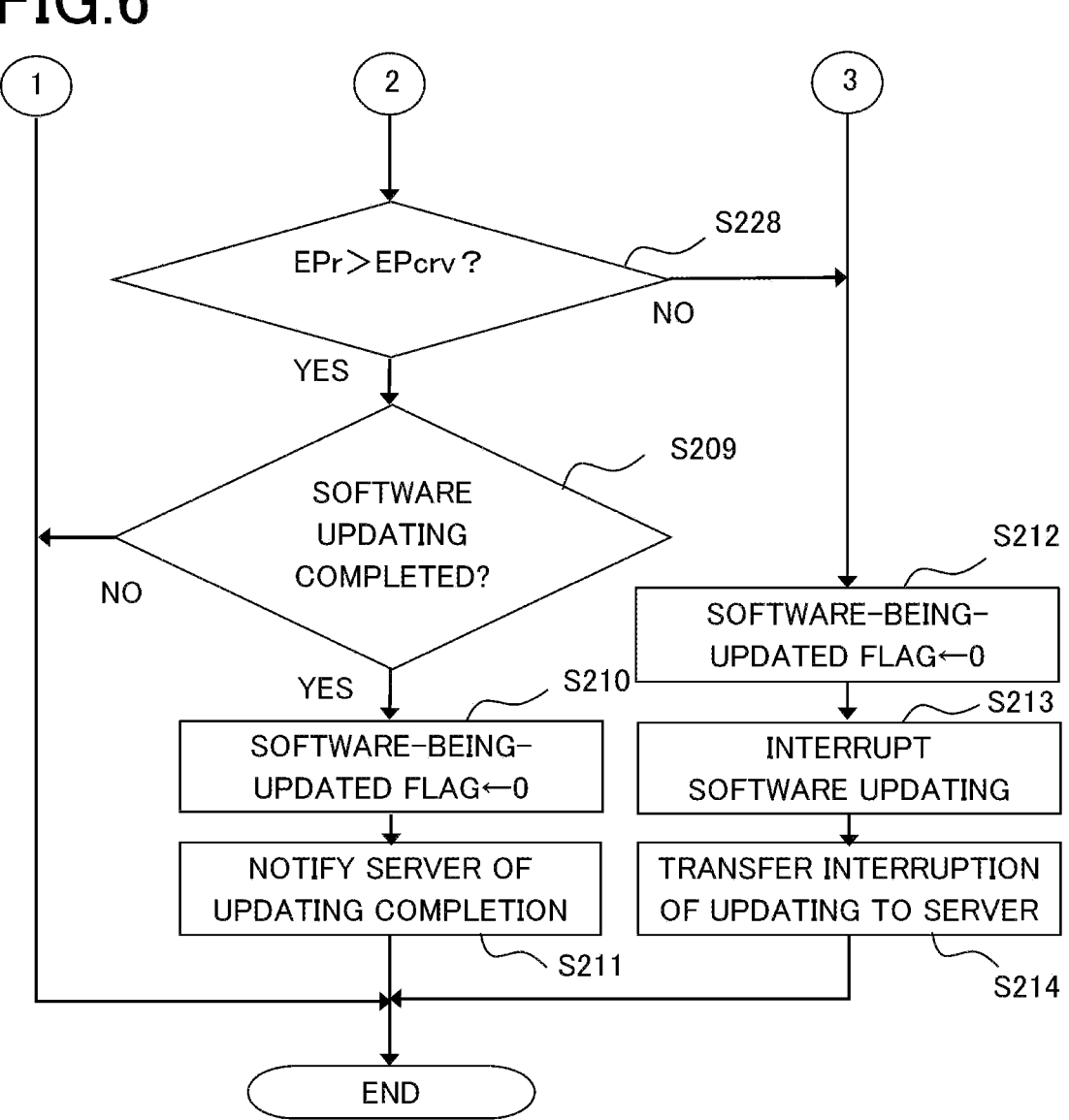
FIG. 6 is a second flowchart representing software-updating continuation processing by the vehicle control apparatus according to Embodiment 2.

FIG. 5 is a first flowchart representing software-updating continuation processing by the vehicle control apparatus 100 according to Embodiment 2. FIG. 6 is a second flowchart representing the software-updating continuation processing by the vehicle control apparatus 100 according to Embodiment 2. The flowchart in FIG. 6 follows the flowchart in FIG. 5.

The flowcharts in FIGS. 5 and 6 according to Embodiment 2 are different from the flowchart in FIG. 4 according to Embodiment 1 in that the step S222 in FIG. 5 to the step S228 in FIG. 6 have replaced the steps S202 and S203. Hereinafter, the different parts will be explained.

In the step S222, the power-source remaining capacity decreasing amount ΔEPr and the power-source remaining capacity EPr are detected so that the software-updating continuation power EPcrv is calculated. Then, in the step S223, it is determined whether or not the power-source remaining capacity decreasing amount ΔEPr is the same as or larger than the predetermined decrease determination value $\Delta$EPj. In the case where the power-source remaining capacity decreasing amount $\Delta$EPr is the same as or larger than the decrease determination value $\Delta$EPj (the determination result is YES), the step S223 is followed by the step S212 in FIG. 6, where a series of processing items for interrupting software updating is performed. This is the case where the software-updating-continuation permission unit 14 does not permit continuation of software updating.

In the case where in the step S223, the power-source remaining capacity decreasing amount $\Delta$EPr is smaller than the decrease determination value $\Delta$EPj (the determination result is NO), the step S223 is followed by the step S224. In the step S224, it is determined whether or not the power-source remaining capacity decreasing amount $\Delta$EPr is smaller than "0". The case where the power-source remaining capacity decreasing amount $\Delta$EPr is smaller than "0" (the determination result is YES) is the case where the power-source remaining capacity is negative (the power-source remaining capacity has increased). The case where the battery 20 has been charged corresponds to the foregoing case. In this case, the software-updating continuation power EPcrv is not corrected and the step S224 is followed by the step S228 in FIG. 6.

In the case where in the step S224, the power-source remaining capacity decreasing amount $\Delta$EPr is not smaller than "0" (the determination result is NO), the step S224 is followed by the step S225. In the step S225, it is determined whether or not the power-source remaining capacity decreasing amount $\Delta$EPr is the same as or smaller than a predetermined second decrease determination value $\Delta$EPj2. In the case where the power-source remaining capacity decreasing amount $\Delta$EPr is not the same as or smaller than the second decrease determination value $\Delta$EPj2 (the determination result is NO), the step S225 is followed by the step S227.

In the step S227, increasing correction is performed by multiplying the software-updating continuation power EPcrv by the predetermined power-source remaining capacity decreasing-timing increasing rate GEP. Then, the step S227 is followed by the step S228 in FIG. 6.

In the case where in the step S225, the power-source remaining capacity decreasing amount $\Delta$EPr is the same as or smaller than the second decrease determination value $\Delta$EPj2 (the determination result is YES), the step S225 is followed by the step S226. In the step S226, increasing correction is performed by multiplying the software-updating continuation power EPcrv by a function corresponding to the power-source remaining capacity decreasing amount $\Delta$EPr. Then, the step S226 is followed by the step S228 in FIG. 6.

In the step S228, it is determined whether or not the power-source remaining capacity EPr is larger than the software-updating continuation power EPcrv. In the case where the power-source remaining capacity EPr is not larger than the software-updating continuation power EPcrv (the determination result is NO), the step S228 is followed by the step S212, where the series of processing items for interrupting software updating is performed.

In the case where in the step S228 in FIG. 6, the power-source remaining capacity EPr is larger than the software-updating continuation power EPcrv (the determination result is YES), the step S228 is followed by the step S209, where it is determined whether or not the software updating has been completed.

Because being configured in the foregoing manner, the vehicle control apparatus 100 according to Embodiment 2 can correct the software-updating continuation power EPcrv in accordance with the power-source remaining capacity decreasing amount $\Delta$EPr so as to finely determine whether or not the software updating can be continued. Accordingly, it is made possible that an unexpected change in the state of the battery 20 is appropriately coped with and that in the case where software updating is feasible, the software updating is continued. As a result, it is made possible to prevent the vehicle control apparatus 100 from abnormally operating and to increase the opportunity for high-stability software updating.

3. Embodiment 3

Because the configuration of the vehicle control apparatus 100 represented in FIGS. 1 and 2 can directly be applied to a vehicle control apparatus according to Embodiment 3, the vehicle control apparatus according to Embodiment 3 will be explained by utilizing the reference numerals as they are. Although the vehicle control apparatus 100 according to Embodiment 3 can be realized only by changing software items, changing hardware items may be included.

<Detection of Power-Source Voltage and Power-Source-Voltage Decreasing Amount>

In contrast to Embodiment 2, in the software-updating continuation processing, the vehicle control apparatus 100 according to Embodiment 3 performs detection by the power-source-remaining-capacity decrease detection unit 16, based on the power-source voltage Vb of the battery 20 and the power-source-voltage decreasing amount $\Delta$Vb. This case will specifically be explained. The power-source-voltage decreasing amount $\Delta$Vb is a voltage decreasing amount from the power-source voltage at a time of starting of software updating. In the present embodiment, a power-source-voltage decreasing amount determination value $\Delta$Vbng, an upper voltage Vbh, and a lower voltage Vbl of the battery 20 are preliminarily determined.

The power-source-voltage decreasing amount determination value $\Delta$Vbng is the determination value for a decreasing amount from the power-source voltage Vb at a time of starting of software updating, and is set, for example, to 1.5 V. In the case where the power-source voltage decreases to exceed this determination value, the software updating is interrupted. The upper voltage Vbh is set, for example, to 12.5 V; the lower voltage Vbl is set, for example, to 11.5 V. The specific values are not limited to the foregoing ones and may be determined to be optimum values through an experiment or the like.

In the case where the power-source voltage Vb is the same as or larger than the upper voltage Vbh, it is determined that there exists no abnormal decrease in the power-source voltage, and hence no increasing correction is applied to the software-updating continuation power EPcrv. Then, the software-updating continuation power EPcrv is directly compared with the power-source remaining capacity EPr.

In the case where the power-source voltage Vb is the same as or larger than the lower voltage Vbl and smaller than the upper voltage Vbh, increasing correction is applied to the software-updating continuation power EPcrv in accordance with the power-source-voltage decreasing amount $\Delta$Vb from the power-source voltage Vb at a time of starting of software updating. For example, the software-updating continuation power EPcrv is increased by 5%, each time the voltage decreases by 0.1 V. Then, the software-updating continuation power EPcrv to which the increasing correction has been applied is compared with the power-source remaining capacity EPr.

In the case where the power-source voltage Vb is smaller than the lower voltage Vbl, increasing correction of 100% is applied to the software-updating continuation power EPcrv. Then, the software-updating continuation power EPcrv to which the increasing correction has been applied is compared with the power-source remaining capacity EPr.

Then, in the case where after the comparison, the power-source remaining capacity EPr is larger than the software-updating continuation power EPcrv, the software updating is permitted. Through the foregoing method, the feasibility of continuing the software updating can be determined by detecting the power-source voltage Vb and the power-source-voltage decreasing amount ΔVb.

<Software-Updating Continuation Processing>

Figure 7:
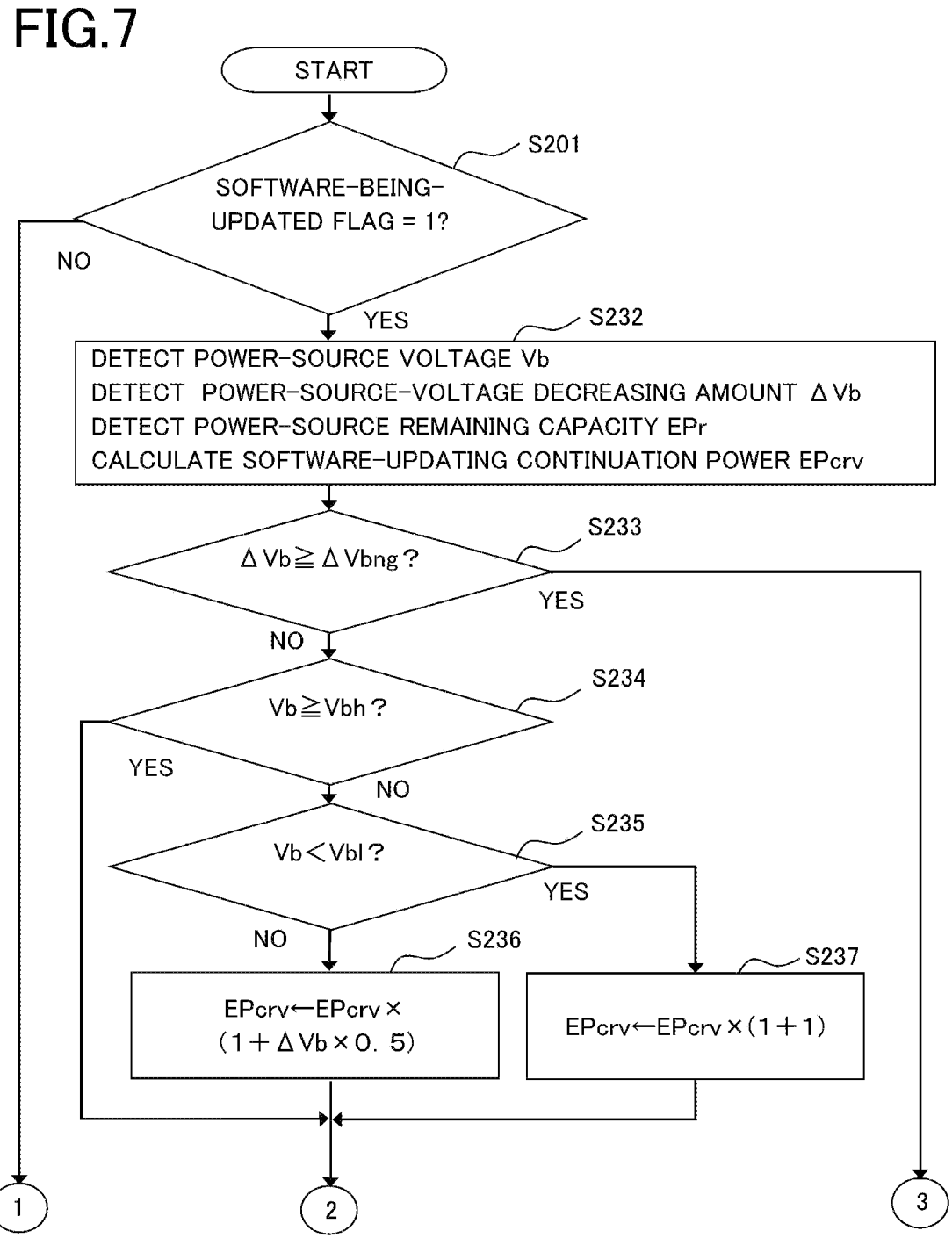
FIG. 7 is a first flowchart representing software-updating continuation processing by a vehicle control apparatus according to Embodiment 3.

FIG. 7 is a first flowchart representing software-updating continuation processing by the vehicle control apparatus 100 according to Embodiment 3. The flowchart in FIG. 7 is directly followed by the flowchart in FIG. 6 according to Embodiment 2.

Hereinafter, the flowchart in FIG. 7 will be explained. The flowchart in FIG. 7 is performed every predetermined time (for example, every 10 ms or every 30 seconds). The processing in the flowchart in FIG. 7 may be performed not every predetermined time but every event, for example, each time the vehicle has traveled a predetermined distance.

In the step S201 after the start of the processing, it is determined whether or not the software-being-updated flag has been set. In the case where the software-being-updated flag has not been set (the determination result is NO), the processing is ended. In the case where the software-being-updated flag has been set (the determination is YES), the step S201 is followed by the step S232.

In the step S232, the power-source voltage Vb and the power-source-voltage decreasing amount ΔVb are detected. Then, the power-source remaining capacity decreasing amount ΔEPr and the power-source remaining capacity EPr are detected so that the software-updating continuation power EPcrv is calculated.

Then, in the step S233, it is determined whether or not the power-source-voltage decreasing amount ΔVb is the same as or larger than the power-source-voltage decreasing amount determination value ΔVbng. In the case where the power-source-voltage decreasing amount ΔVb is the same as or larger than the power-source-voltage decreasing amount determination value ΔVbng (the determination result is YES), the step S233 is followed by the step S212 in FIG. 6, where a series of processing items for interrupting software updating is performed. This is the case where the software-updating-continuation permission unit 14 does not permit continuation of software updating.

In the case where in the step S203, the power-source-voltage decreasing amount ΔVb is smaller than the power-source-voltage decreasing amount determination value ΔVbng (the determination result is NO), the step S233 is followed by the step S234. In the step S234, it is determined whether or not the power-source voltage Vb is the same as or larger than the upper voltage Vbh. The case where the power-source voltage Vb is the same as or larger than the upper voltage Vbh (the determination result is YES) is the one where there exists no abnormal decrease in the power-source voltage. In this case, the software-updating continuation power EPcrv is not corrected and the step S234 is followed by the step S228 in FIG. 6.

In the case where in the step S234, the power-source voltage Vb is smaller than the upper voltage Vbh (the determination result is NO), the step S234 is followed by the step S235. In the step S235, it is determined whether or not the power-source voltage Vb is smaller than the lower voltage Vbl. In the case where the power-source voltage Vb is smaller than the lower voltage Vbl (the determination result is YES), the step S235 is followed by the step S237.

In the step S237, increasing correction for doubling (increasing by 100%) the software-updating continuation power EPcrv is performed. Then, the step S237 is followed by the step S228 in FIG. 6.

In the case where in the step S235, the power-source voltage Vb is the same as or larger than the lower voltage Vbl (the determination result is NO), the step S235 is followed by the step S236. In the step S236, there is performed increasing correction in which the software-updating continuation power EPcrv is increased by 5%, each time the power-source-voltage decreasing amount ΔVb increases by 0.1 V. That is to say, in the increasing correction, the software-updating continuation power EPcrv is multiplied by $(1+\Delta Vb \times 0.5)$. Then, the step S236 is followed by the step S228 in FIG. 6.

Because the vehicle control apparatus 100 according to Embodiment 3 is configured in the foregoing manner, the feasibility of continuing the software updating can be determined by detecting the power-source voltage Vb and the power-source-voltage decreasing amount ΔVb. Because the software-updating continuation power EPcrv is corrected in accordance with the power-source-voltage decreasing amount ΔVb, it can be finely determined whether or not the software updating can be continued. Through a simple method, it is made possible to prevent the vehicle control apparatus 100 from abnormally operating and to increase the opportunity for high-stability software updating.

4. Embodiment 4

Because the configuration of the vehicle control apparatus 100 represented in FIGS. 1 and 2 can directly be applied to a vehicle control apparatus according to Embodiment 4, the vehicle control apparatus according to Embodiment 3 will be explained by utilizing the reference numerals as they are. Although the vehicle control apparatus 100 according to Embodiment 4 can be realized only by changing software items, changing hardware items may be included.

<Detection of Cold Cranking Ampere>

In contrast to Embodiment 2, in the software-updating continuation processing, the vehicle control apparatus 100 according to Embodiment 4 performs detection by the power-source-remaining-capacity decrease detection unit 16, based on the CCA, which is the "Cold Cranking Amperes" of the battery 20. This case will specifically be explained.

"CCA" is a U.S. evaluation standard determined by the specification related to a battery. "CCA" specifies that when a rated current is made to flow for 30 seconds under an environment of −18° C., the battery has an inter-terminal voltage of the same as or larger than 7.2 V. For example, "CCA630" signifies the ability of a battery that secures an inter-terminal voltage of the same as or larger than 7.2 V, when a current of 630 mA is made to flow for 30 seconds under the environment of −18° C.

The rate of a cranking current Icc, which is the CCA of a battery whose power-source remaining capacity has decreased due to discharge, to a cranking current initial value Iccin, which is the CCA of the battery that has just been produced and fully charged, is defined as a CCA rate Rcca (Rcca=Icc/Iccini). A CCA rate decreasing amount ΔRcca, which is the difference between a software-updating-starting-timing CCA rate Rccast and the present CCA rate Rcca, can be defined in such a way that $\Delta Rcca=Rccast-Rcca$ (Icc, Iccini, and Rccast are not represented).

In order to measure a CCA, there exist a conductance method, an impedance method, a resistance method, and the like. A CCA can simply be ascertained with a CCA measurement tester.

In the vehicle control apparatus 100 according to Embodiment 4, the power-source remaining capacity EPr of the battery 20 is ascertained based on the cold cranking ampere CCA, the CCA rate Rcca, and the CCA rate decreasing amount $\Delta Rcca$. In the present embodiment, a CCA decreasing amount determination value $\Delta Rccang$, a CCA upper rate Rccah, and a CCA lower rate Rccal are preliminarily determined.

The CCA decreasing amount determination value $\Delta Rccang$ is a determination value for the CCA rate decreasing amount $\Delta Rcca$ from the CCA rate Rcca at a time of starting of software updating and is set to, for example, 35%. In the case where the CCA rate decreasing amount $\Delta Rcca$ increases to exceed this determination value, the software updating is interrupted. The CCA upper rate Rccah and the CCA lower rate Rccal are set to, for example, 100% and 70%, respectively. The specific values are not limited to the foregoing ones and may be determined to be optimum values through an experiment or the like.

In the case where the CCA rate Rcca is the same as or larger than the CCA upper rate Rccah, it is determined that there exists no abnormal decrease in the power-source remaining capacity, and hence no increasing correction is applied to the software-updating continuation power EPcrv. Then, the software-updating continuation power EPcrv is directly compared with the power-source remaining capacity EPr.

In the case where the CCA rate Rcca is the same as or larger than the CCA lower rate Rccal and smaller than the CCA upper rate Rccah, increasing correction is applied to the software-updating continuation power EPcrv in accordance with the CCA rate decreasing amount $\Delta Rcca$ from the software-updating-starting-timing CCA rate Rccast. For example, each time the CCA rate Rcca decrease, the software-updating continuation power EPcrv is increased in proportion to the CCA rate decreasing amount $\Delta Rcca$. Then, the software-updating continuation power EPcrv to which the increasing correction has been applied is compared with the power-source remaining capacity EPr.

In the case where the CCA rate Rcca is smaller than the CCA lower rate Rccal, increasing correction of 100% is applied to the software-updating continuation power EPcrv. Then, the software-updating continuation power EPcrv to which the increasing correction has been applied is compared with the power-source remaining capacity EPr.

Then, in the case where after the comparison, the power-source remaining capacity EPr is larger than the software-updating continuation power EPcrv, the software updating is permitted. Through the foregoing method, the feasibility of continuing the software updating can be determined by detecting the CCA rate Rcca and the CCA rate decreasing amount $\Delta Rcca$.

<Software-Updating Continuation Processing>

Figure 8:
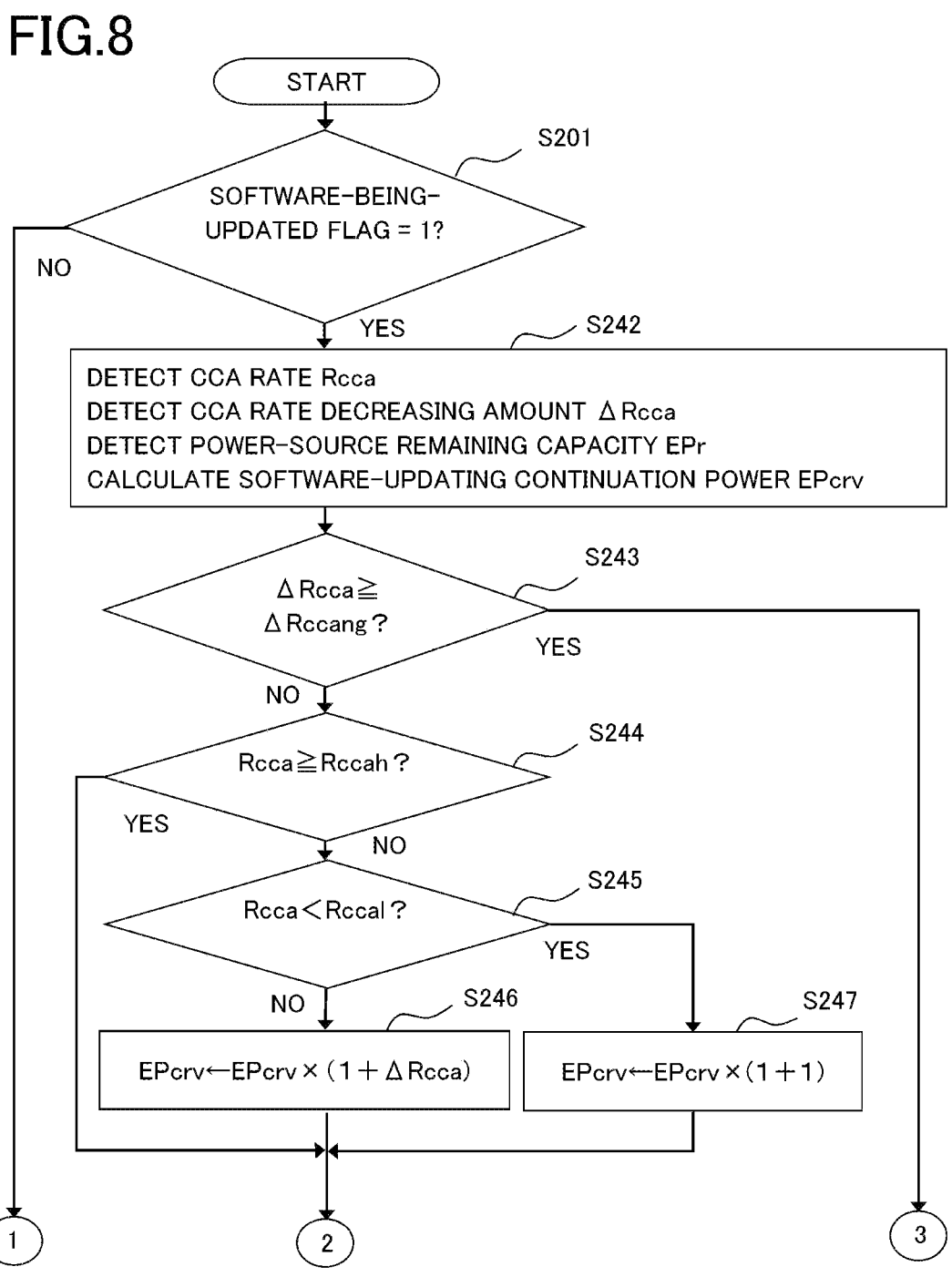
FIG. 8 is a first flowchart representing software-updating continuation processing by a vehicle control apparatus according to Embodiment 4.

FIG. 8 is a first flowchart representing software-updating continuation processing by the vehicle control apparatus 100 according to Embodiment 4. The flowchart in FIG. 8 is directly followed by the flowchart in FIG. 6 according to Embodiment 2.

Hereinafter, the flowchart in FIG. 8 will be explained. The flowchart in FIG. 8 is performed every predetermined time (for example, every 10 ms or every 30 seconds). The processing in the flowchart in FIG. 8 may be performed not every predetermined time but every event, for example, each time the vehicle has traveled a predetermined distance.

In the step S201 after the start of the processing, it is determined whether or not the software-being-updated flag has been set. In the case where the software-being-updated flag has not been set (the determination result is NO), the processing is ended. In the case where the software-being-updated flag has been set (the determination result is YES), the step S201 is followed by the step S242.

In the step S242, the CCA rate Rcca and the CCA rate decreasing amount $\Delta Rcca$ are detected. Then, the power-source remaining capacity EPr is detected so as to calculate the software-updating continuation power EPcrv.

Then, in the step S243, it is determined whether or not the CCA rate decreasing amount $\Delta Rcca$ is the same as or larger than the CCA decreasing amount determination value $\Delta Rccang$. In the case where the CCA rate decreasing amount $\Delta Rcca$ is the same as or larger than the CCA decreasing amount determination value $\Delta Rccang$ (the determination result is YES), the step S243 is followed by the step S212 in FIG. 6, where a series of processing items for interrupting software updating is performed. This is the case where the software-updating-continuation permission unit 14 does not permit continuation of software updating.

In the case where in the step S243, the CCA rate decreasing amount $\Delta Rcca$ is smaller than the CCA decreasing amount determination value $\Delta Rccang$ (the determination result is NO), the step S243 is followed by the step S244. In the step S244, it is determined whether or not the CCA rate Rcca is larger than the CCA upper rate Rccah. The case where the CCA rate Rcca is the same as or larger than the CCA upper rate Rccah (the determination result is YES) is the one where there exists no abnormal decrease in the power-source voltage. In this case, the software-updating continuation power EPcrv is not corrected and the step S244 is followed by the step S228 in FIG. 6.

In the case where in the step S244, the CCA rate Rcca is smaller than the CCA upper rate Rccah (the determination result is NO), the step S244 is followed by the step S245. In the step S245, it is determined whether or not the CCA rate Rcca is smaller than the CCA lower rate Rccal. In the case where the CCA rate Rcca is smaller than the CCA lower rate Rccal (the determination result is YES), the step S245 is followed by the step S247.

In the step S247, increasing correction for doubling (increasing by 100%) the software-updating continuation power EPcrv is performed. Then, the step S247 is followed by the step S228 in FIG. 6.

In the case where in the step S245, the CCA rate Rcca is the same as or larger than the CCA lower rate Rccal (the determination result is NO), the step S245 is followed by the step S246. In the step S246, increasing correction is applied to the software-updating continuation power EPcrv in proportion to the CCA rate decreasing amount $\Delta Rcca$. That is to say, in the increasing correction, the software-updating continuation power EPcrv is multiplied by $(1+\Delta Rcca)$. Then, the step S246 is followed by the step S228 in FIG. 6.

Because the vehicle control apparatus 100 according to Embodiment 4 is configured in the foregoing manner, the feasibility of continuing the software updating can be determined by detecting the CCA rate Rcca and the CCA rate decreasing amount $\Delta Rcca$. Because the software-updating continuation power EPcrv is corrected in accordance with the CCA rate decreasing amount $\Delta Rcca$, it can be finely determined whether or not the software updating can be continued. It is made possible to prevent the vehicle control apparatus 100 from abnormally operating and to increase the opportunity for high-stability software updating.

5. Embodiment 5

Because the configuration of the vehicle control apparatus 100 represented in FIGS. 1 and 2 can directly be applied to a vehicle control apparatus according to Embodiment 5, the vehicle control apparatus according to Embodiment 5 will be explained by utilizing the reference numerals as they are. Although the vehicle control apparatus 100 according to Embodiment 5 can be realized only by changing software items, changing hardware items may be included.
<Detection of Battery-Liquid Specific Gravity>

In contrast to Embodiment 2, in the software-updating continuation processing, the vehicle control apparatus 100 according to Embodiment 5 performs detection by the power-source-remaining-capacity decrease detection unit 16, based on the battery-liquid specific gravity SG of the battery 20. This case will specifically be explained.

The battery-liquid specific gravity SG has a correlation with the charging state of a battery. Accordingly, the power-source remaining capacity EPr can be calculated by detecting the battery-liquid specific gravity SG.

In the vehicle control apparatus 100 according to Embodiment 5, the power-source remaining capacity EPr of the battery 20 is ascertained based on the battery-liquid specific gravity SG and the battery-liquid specific gravity decreasing amount ΔSG. In the present embodiment, a battery-liquid specific gravity decreasing amount determination value ΔSGng, a battery-liquid upper specific gravity SGh, and a battery-liquid lower specific gravity SGl are preliminarily determined.

The battery-liquid specific gravity decreasing amount determination value ΔSGng is a determination value for the battery-liquid specific gravity decreasing amount ΔSG from the battery-liquid specific gravity SG and is set to, for example, 0.08. In the case where the battery-liquid specific gravity decreasing amount ΔSG increases to exceed this determination value, the software updating is interrupted. The battery-liquid upper specific gravity SGh is set, for example, to 1.28; the battery-liquid lower specific gravity SGl is set, for example, to 1.21. The specific values are not limited to the foregoing ones and may be determined to be optimum values through an experiment or the like.

In the case where the battery-liquid specific gravity SG is the same as or larger than the battery-liquid upper specific gravity SGh, it is determined that there exists no abnormal decrease in the power-source remaining capacity, and hence no increasing correction is applied to the software-updating continuation power EPcrv. Then, the software-updating continuation power EPcrv is directly compared with the power-source remaining capacity EPr.

In the case where the battery-liquid specific gravity SG is the same as or larger than the battery-liquid lower specific gravity SGl and smaller than the battery-liquid upper specific gravity SGh, increasing correction is applied to the software-updating continuation power EPcrv in accordance with the battery-liquid specific gravity decreasing amount ΔSG from the battery-liquid specific gravity SG. For example, the software-updating continuation power EPcrv is increased by 7%, each time the battery-liquid specific gravity SG decreases by 0.01. Then, the software-updating continuation power EPcrv to which the increasing correction has been applied is compared with the power-source remaining capacity EPr.

In the case where the battery-liquid specific gravity SG is smaller than the battery-liquid lower specific gravity SGl, increasing correction of 100% is applied to the software-updating continuation power EPcrv. Then, the software-updating continuation power EPcrv to which the increasing correction has been applied is compared with the power-source remaining capacity EPr.

Then, in the case where after the comparison, the power-source remaining capacity EPr is larger than the software-updating continuation power EPcrv, the software updating is permitted. Through the foregoing method, the feasibility of continuing the software updating can be determined by detecting the battery-liquid specific gravity SG and the battery-liquid specific gravity decreasing amount ΔSG.
<Software-Updating Continuation Processing>

Figure 9:
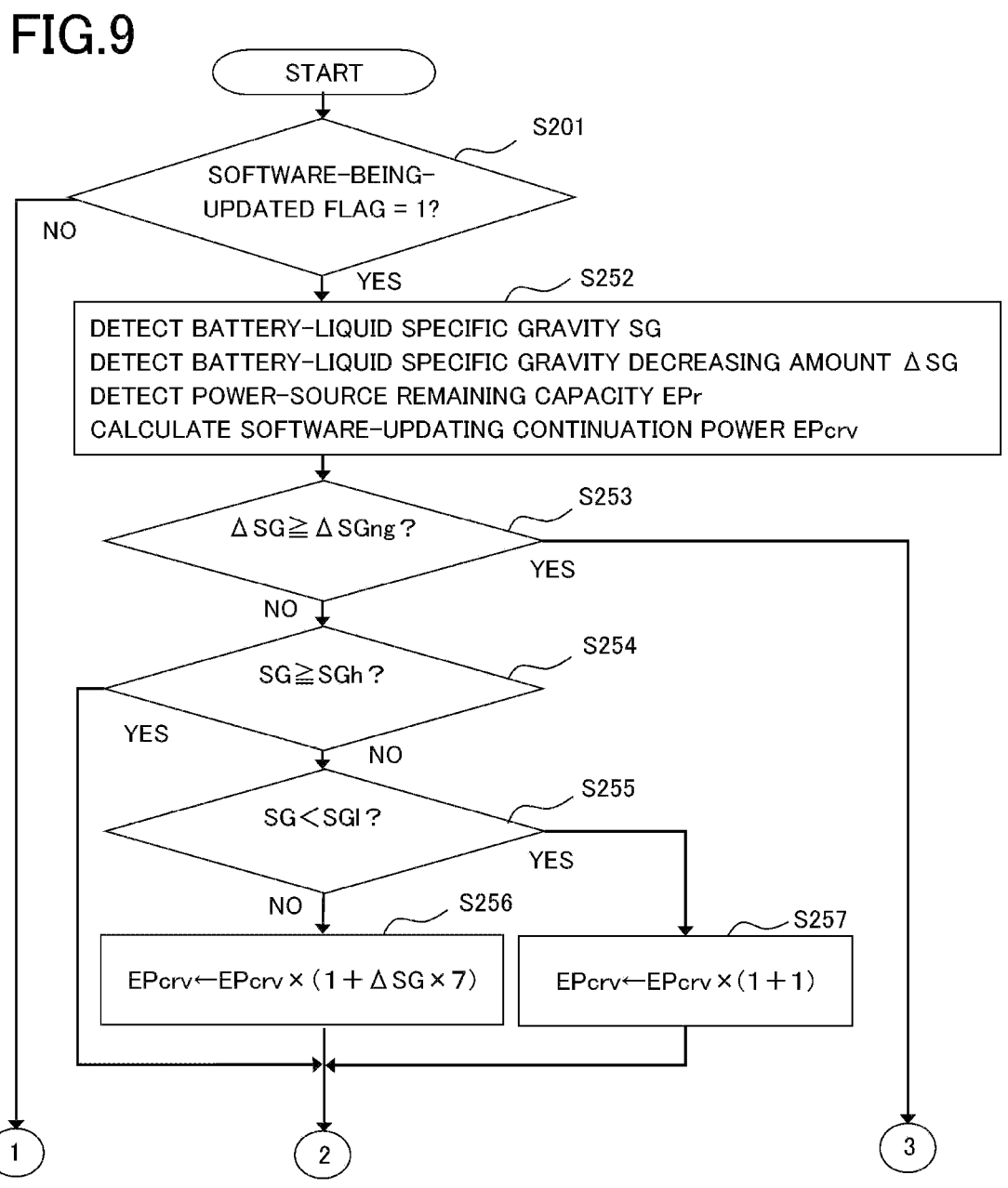
FIG. 9 is a first flowchart representing software-updating continuation processing by a vehicle control apparatus according to Embodiment 5.

FIG. 9 is a first flowchart representing software-updating continuation processing by the vehicle control apparatus 100 according to Embodiment 5. The flowchart in FIG. 9 is directly followed by the flowchart in FIG. 6 according to Embodiment 2.

Hereinafter, the flowchart in FIG. 9 will be explained. The flowchart in FIG. 9 is performed every predetermined time (for example, every 10 ms or every 30 seconds). The processing in the flowchart in FIG. 9 may be performed not every predetermined time but every event, for example, each time the vehicle has traveled a predetermined distance.

In the step S201 after the start of the processing, it is determined whether or not the software-being-updated flag has been set. In the case where the software-being-updated flag has not been set (the determination result is NO), the processing is ended. In the case where the software-being-updated flag has been set (the determination is YES), the step S201 is followed by the step S252.

In the step S252, the battery-liquid specific gravity SG and the battery-liquid specific gravity decreasing amount ΔSG are detected. Then, the power-source remaining capacity EPr is detected so as to calculate the software-updating continuation power EPcrv.

Then, in the step S253, it is determined whether or not the battery-liquid specific gravity decreasing amount ΔSG is the same as or larger than the battery-liquid specific gravity decreasing amount determination value ΔSGng. In the case where the battery-liquid specific gravity decreasing amount ΔSG is the same as or larger than the battery-liquid specific gravity decreasing amount determination value ΔSGng (the determination result is YES), the step S253 is followed by the step S212 in FIG. 6, where a series of processing items for interrupting software updating is performed. This is the case where the software-updating-continuation permission unit 14 does not permit continuation of software updating.

In the case where in the step S253, the battery-liquid specific gravity decreasing amount ΔSG is smaller than the battery-liquid specific gravity decreasing amount determination value ΔSGng (the determination result is NO), the step S253 is followed by the step S254. In the step S254, it is determined whether or not the battery-liquid specific gravity SG is the same as or larger than the battery-liquid upper specific gravity SGh. The case where the battery-liquid specific gravity SG is the same as or larger gravity SGh (the than the battery-liquid upper specific determination result is YES) is the one where there exists no abnormal decrease in the power-source voltage. In this case, the software-updating continuation power EPcrv is not corrected and the step S254 is followed by the step S228 in FIG. 6.

In the case where in the step S254, the battery-liquid specific gravity SG is smaller than the battery-liquid upper specific gravity SGh (the determination result is NO), the step S254 is followed by the step S255. In the step S255, it is determined whether or not the battery-liquid specific gravity SG is smaller than the battery-liquid lower specific gravity SGl. In the case where the battery-liquid specific gravity SG is smaller than the battery-liquid lower specific gravity SGl (the determination result is YES), the step S255 is followed by the step S257.

In the step S257, increasing correction for doubling (increasing by 100%) the software-updating continuation power EPcrv is performed. Then, the step S257 is followed by the step S228 in FIG. 6.

In the case where in the step S255, the battery-liquid specific gravity SG is the same as or larger than the battery-liquid lower specific gravity SGl (the determination result is NO), the step S255 is followed by the step S256. In the step S256, increasing correction of 7% is applied to the software-updating continuation power EPcrv, each time the battery-liquid specific gravity decreasing amount ΔSG increases by 0.01. That is to say, in the increasing correction, the software-updating continuation power EPcrv is multiplied by (1+ΔSG×7). Then, the step S256 is followed by the step S228 in FIG. 6.

Because the vehicle control apparatus 100 according to Embodiment 5 is configured in the foregoing manner, the feasibility of continuing the software updating can be determined by detecting the battery-liquid specific gravity SG and the battery-liquid specific gravity decreasing amount ΔSG. Because the software-updating continuation power EPcrv is corrected in accordance with the battery-liquid specific gravity decreasing amount ΔSG, it can be finely determined whether or not the software updating can be continued. It is made possible to prevent the vehicle control apparatus 100 from abnormally operating and to increase the opportunity for high-stability software updating.

6. Embodiment 6

Because the configuration of the vehicle control apparatus 100 represented in FIGS. 1 and 2 can directly be applied to a vehicle control apparatus 100 according to Embodiment 6, the vehicle control apparatus 100 according to Embodiment 6 will be explained by utilizing the reference numerals as they are. Although the vehicle control apparatus 100 according to Embodiment 6 can be realized only by changing software items, changing hardware items may be included.

<Excess of Battery Usable Years>

In contrast to Embodiment 2, in the software-updating continuation processing, the vehicle control apparatus 100 according to Embodiment 6 performs detection by the power-source-remaining-capacity decrease detection unit 16, based on the battery utilization years, the history of battery exhaustion, and the traveling state. This case will specifically be explained.

In some cases, the battery 20 mounted in a vehicle has been being utilized for 5 years or longer exceeding the usable years (the durable years of a product). In such cases, it can be presumed that the battery 20 has been deteriorated. In addition, the power-source remaining capacity EPr may rapidly decrease at a time when software is updated.

In a determination on software-updating continuation, increasing correction of the software-updating continuation power EPcrv makes it possible to promote software updating, with a margin in comparison with the power-source remaining capacity EPr. Accordingly, in the case where the battery has been being utilized for 5 years or longer exceeding the usable years thereof, increasing correction of 100% is applied to the software-updating continuation power EPcrv.

<History of Battery Exhaustion>

In some cases, when a vehicle battery typified by a lead-acid battery is discharged to the extent where the power-source remaining capacity becomes so small that a voltage drop occurs, an irreversible change occurs in the battery and hence the initial performance cannot be restored despite recharging. Consideration of such a case makes it possible to presume that when there exists two or more times of battery-exhaustion histories, the battery is deteriorated. Also in this case, the power-source remaining capacity EPr may rapidly decrease at a time when software is updated.

In a determination on software-updating continuation, increasing correction of the software-updating continuation power EPcrv makes it possible to promote software updating, with a margin in comparison with the power-source remaining capacity EPr. Accordingly, in the case where the battery has two or more times of battery-exhaustion histories in the past time, increasing correction of 100% is applied to the software-updating continuation power EPcrv.

<Repetition of Long-Period Stoppage or Short-Distance Traveling>

The state of the battery 20 largely changes depending on the usage situation of the vehicle. In the case where the vehicle has not been operated for one month or longer, it can be presumed that because there has existed no opportunity for charging the battery 20 with the prime mover, the power-source remaining capacity has largely decreased. In addition, in the case where even when a vehicle is travelling, the vehicle has continually travelled 2 km or shorter distance ten or more times, there exists no opportunity for sufficiently charging the battery 20 with the prime mover thereof; thus, it can also be presumed that the power-source remaining capacity has largely decreased. Also in this case, the power-source remaining capacity EPr may rapidly decrease at a time when software is updated.

In a determination on software-updating continuation, increasing correction of the software-updating continuation power EPcrv makes it possible to promote software updating, with a margin in comparison with the power-source remaining capacity EPr. Thus, in the case where a vehicle has not been driven for one month or longer or in the case where the vehicle has continually travelled 2 km or shorter distance ten or more times, increasing correction of 100% is applied to the software-updating continuation power EPcrv.

<Software-Updating Continuation Processing>

Figure 10:
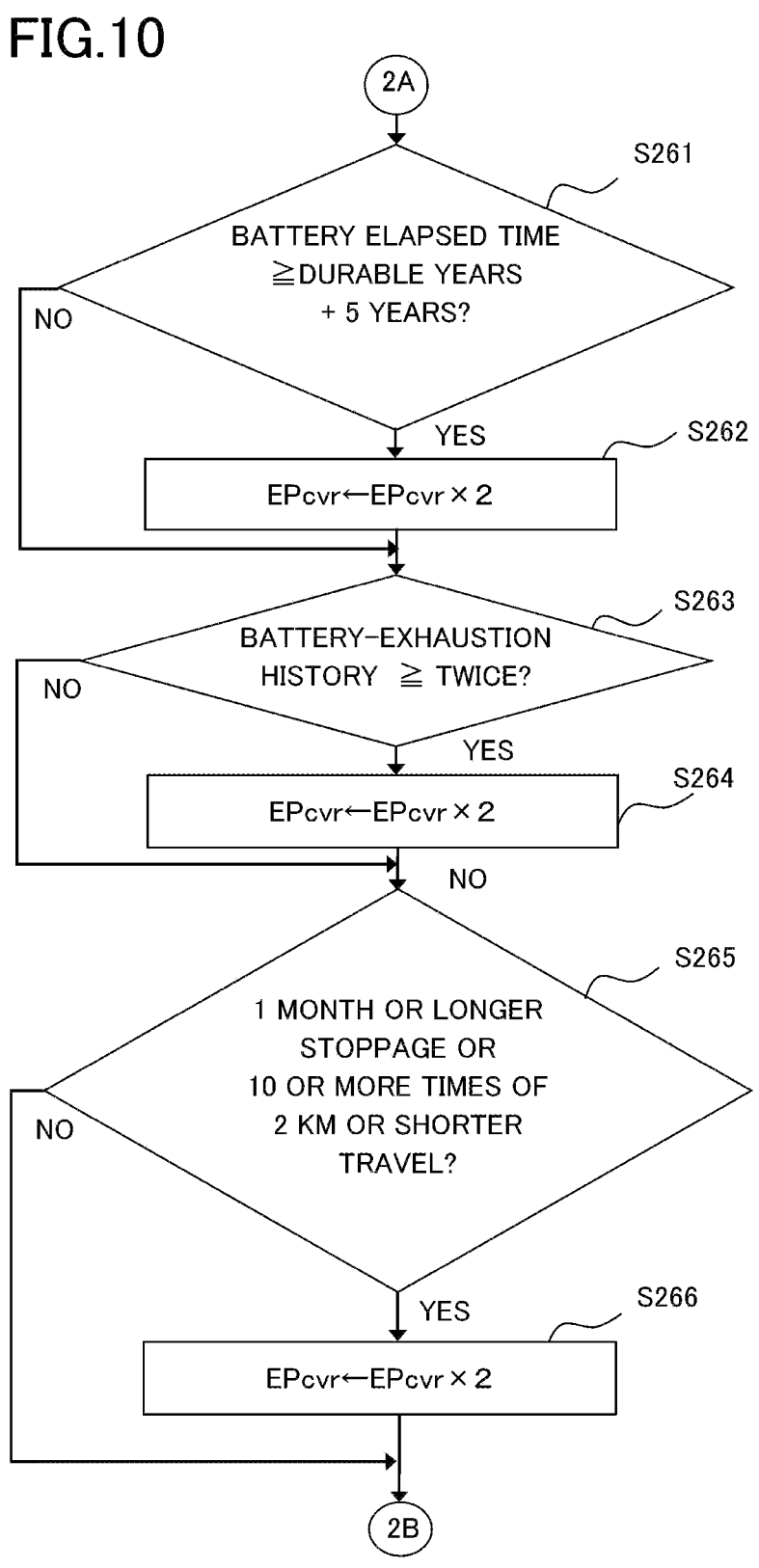
FIG. 10 is a third flowchart representing software-updating continuation processing by a vehicle control apparatus according to Embodiment 6.

FIG. 10 is a third flowchart representing software-updating continuation processing by the vehicle control apparatus 100 according to Embodiment 6. The flowchart in FIG. 10 is inserted before the step S228 of the second flowchart in FIG. 6 according to Embodiment 2. The first flowchart in FIG. 5 is provided before the flowchart in FIG. 10; the second flowchart is provided after the flowchart in FIG. 10. The processing is performed in FIGS. 5, 10, and 6 in that order. FIGS. 5 and 6 are utilized as they are; thus, in the present embodiment, FIG. 10 will be explained.

In the first flowchart, in FIG. 5 according to Embodiment 2, representing the software-updating continuation processing, the software-updating continuation power EPcrv is calculated and then increasing correction is applied thereto, as may be necessary. Then, the first flowchart is followed by the step S261 of the flowchart in FIG. 10.

In the step S261, it is determined whether or not the elapsed time since the battery 20 has been installed in a vehicle exceeds the period obtained by adding 5 years to the usable years (lifetime) of the battery 20. In the case where in the step S261, the elapsed time of the battery 20 is shorter than the period obtained by adding 5 years to the lifetime (the determination result is NO), the step S261 is directly followed by the step S263.

In the case where in the step S261, the elapsed time of the battery 20 is the same as or longer than the period obtained by adding 5 years to the lifetime (the determination result is YES), the step S261 is followed by the step S262, where increasing correction of 100% is applied to the software-updating continuation power EPcrv. After that, the step S262 is followed by the step S263.

In the step S263, it is determined whether or not the battery 20 has two or more times of battery-exhaustion histories. In the case where the battery 20 does not have two or more times of battery-exhaustion histories (the determination result is NO), the step S263 is directly followed by the step S265.

In the case where in the step S263, the battery 20 has two or more times of battery-exhaustion histories (the determination result is YES), the step S263 is followed by the step S264, where increasing correction of 100% is applied to the software-updating continuation power EPcrv. After that, the step S264 is followed by the step S265.

In the step S265, a determination on the vehicle traveling state is performed. It is determined whether or not the vehicle has stopped for one month or longer or has travelled 2 km or shorter distance ten or more times. In the case where the vehicle has neither stopped for one month or longer nor travelled 2 km or shorter distance ten or more times (the determination result is NO), the step S265 is directly followed by the step S228.

In the case where in the step S265, the vehicle has stopped for one month or longer or has travelled 2 km or shorter distance ten or more times (the determination result is YES), the step S265 is followed by the step S266, where increasing correction of 100% is applied to the software-updating continuation power EPcrv. Then, the step S266 is followed by the step S228 in FIG. 6.

Because being configured in the foregoing manner, the vehicle control apparatus 100 according to Embodiment 6 can correct the software-updating continuation power EPcrv in accordance with a situation such as excess of battery usable years, a battery-exhaustion history, long-period stoppage, or repetition of short-distance traveling so as to finely determine whether or not the software updating can be continued. It is made possible to prevent the vehicle control apparatus 100 from abnormally operating and to increase the opportunity for high-stability software updating.

In addition, 5 years as the determination time for excess of the battery lifetime, two times as the determination times for battery-exhaustion histories, one month as the stoppage determination period, 2 km as the determination distance for short-distance traveling, and 10 times as the determination times for short-distance traveling are examples of determination values; it may be allowed that these determination values are changed. Moreover, 100%, which is the increasing-correction amount for the software-updating continuation power EPcrv, is an example of the correction amount and may be changed. These determination values may be determined by finding optimum ones through an experiment or a simulation. Moreover, part of the determinations described in the steps S261, S263, and S265 may be omitted.

7. Embodiment 7

Because the configuration of the vehicle control apparatus 100 represented in FIGS. 1 and 2 can directly be applied to a vehicle control apparatus 100 according to Embodiment 7, the vehicle control apparatus 100 according to Embodiment 7 will be explained by utilizing the reference numerals as they are. Although the vehicle control apparatus 100 according to Embodiment 7 can be realized only by changing software items, changing hardware items may be included. <Software-Updating Time>

In contrast to Embodiment 1, in the software-updating continuation processing, the vehicle control apparatus 100 according to Embodiment 7 calculates a time Trv required for completion of software writing; in the case where the time Trv is the same as or shorter than a predetermined writing completion time Tcmp, the software-updating-continuation permission unit 14 does not perform a continuation-feasibility determination during software updating. The writing completion time Tcmp may be set to, for example, 2 minutes. The writing completion time Tcmp may be set to an appropriate value through an experiment of a simulation.

Omitting unnecessary software-updating continuation-feasibility determination in such a manner makes it possible to efficiently complete software-updating work in a short time. Moreover, because unnecessary processing can be omitted, wasteful consumption of the power-source remaining capacity of the battery 20 can be reduced. <Software-Updating Continuation Processing>

Figure 11:
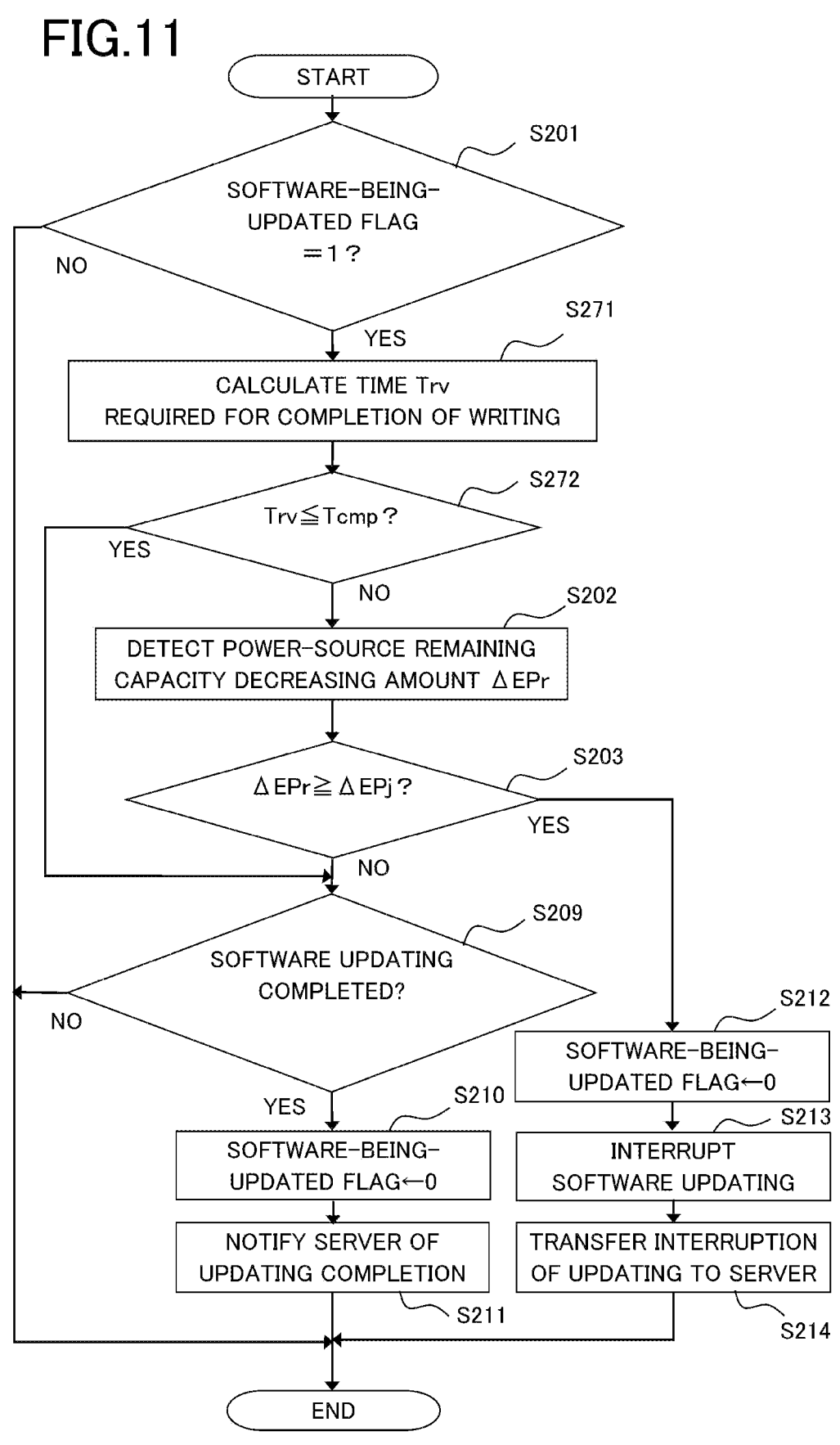
FIG. 11 is a flowchart representing software-updating continuation processing by a vehicle control apparatus according to Embodiment 7.

FIG. 11 is a flowchart representing software-updating continuation processing by the vehicle control apparatus 100 according to Embodiment 7. The flowchart in FIG. 11 is different from the flowchart, in FIG. 4 according to Embodiment 1, representing software-updating continuation processing only in that the steps S271 and S272 are newly added between the steps S201 and S202. The added part will be explained.

In the case where in the step S201 in FIG. 11, the software-being-updated flag has been set, the step S201 is followed by the step S271. In the step S271, in order to updating software, there is calculated the time Trv required for completion of writing updating software in the storage apparatus 91 Then, the step S271 is followed by the step S272.

In the step S272, it is determined whether or not the time Trv required for completion of writing is the same as or shorter than the predetermined writing completion time Tcmp. In the case where the time Trv required for completion of writing is the same as or shorter than the predetermined writing completion time Tcmp, the S272 is followed by the step S209, where it is ascertained whether or not the software updating has been completed.

Such a configuration makes it possible that in the case where the time Trv required for completion of writing updating software is the same as or shorter than the writing completion time Tcmp, software-updating continuation-feasibility determination such as ascertainment of the power-source remaining capacity decreasing amount ΔEPr is omitted.

8. Embodiment 8

Because the configuration of the vehicle control apparatus 100 represented in FIGS. 1 and 2 can directly be applied to a vehicle control apparatus 100 according to Embodiment 8, the vehicle control apparatus 100 according to Embodiment 8 will be explained by utilizing the reference numerals as they are. Although the vehicle control apparatus 100 according to Embodiment 8 can be realized only by changing software items, changing hardware items may be included. <In the Case where there Exists Excessive Electric Power>

In contrast to Embodiment 1, in the software-updating continuation processing, the vehicle control apparatus 100 according to Embodiment 8 determines whether or not the power-source remaining capacity EPr is larger than the electric power obtained by adding predetermined excessive electric power EPex to the software-updating electric power EPrv calculated in the software-updating starting processing. In the case where the power-source remaining capacity EPr has a sufficient margin in comparison with the software-updating electric power EPrv (having a margin corresponding to the excessive electric power EPex), the software-updating-continuation permission unit 14 does not perform a continuation-feasibility determination during software updating. The excessive electric power EPex may be set to, for example, 20% of the power-source remaining capacity at a time when the battery 20 has been fully charged. The excessive electric power EPex may be set to an appropriate value through an experiment of a simulation.

As described above, in the case where the power-source remaining capacity EPr has a margin corresponding to the excessive electric power EPex, omitting the software-updating continuation-feasibility determination makes it possible to efficiently complete software-updating work in a short time. Moreover, because unnecessary processing can be omitted, wasteful consumption of the power-source remaining capacity of the battery 20 can be reduced.

<Software-Updating Continuation Processing>

Figure 12:
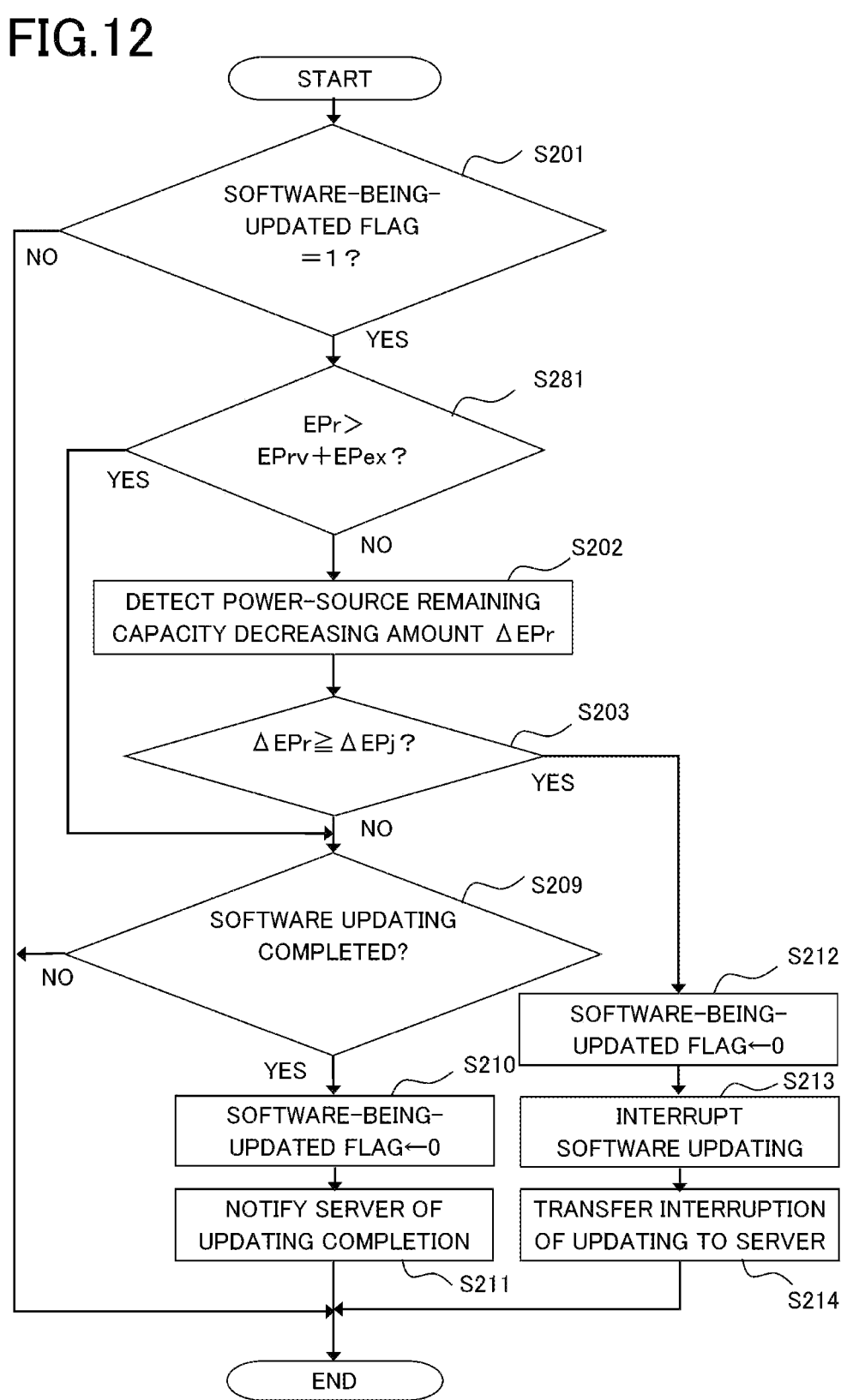
FIG. 12 is a flowchart representing software-updating continuation processing by a vehicle control apparatus according to Embodiment 8.

FIG. 12 is a flowchart representing software-updating continuation processing by the vehicle control apparatus according to Embodiment 8. The flowchart in FIG. 12 is different from the flowchart, in FIG. 4 according to Embodiment 1, representing software-updating continuation processing only in that the step S281 is newly added between the steps S201 and S202. The added part will be explained.

In the case where in the step S201 in FIG. 12, the software-being-updated flag has been set, the step S201 is followed by the step S281. In the step S281, it is determined whether or not the power-source remaining capacity EPr is larger than the sum of the software-updating electric power EPrv and the excessive electric power EPex. In the case where the power-source remaining capacity EPr is not larger than the sum of the software-updating electric power EPrv and the excessive electric power EPex (the determination result is NO), the step S281 is followed by the step S202, the software-updating continuation-feasibility determination is implemented.

In the case where in the step S281, the power-source remaining capacity EPr is larger than the sum of the software-updating electric power EPrv and the excessive electric power EPex (the determination result is YES), the step S281 is followed by the step S209, where it is determined whether or not the software updating has been completed.

Such a configuration makes it possible that in the case where the battery 20 has the excessive electric power EPex, the software-updating continuation-feasibility determination such as ascertainment of the power-source remaining capacity decreasing amount ΔEPr is omitted.

9. Embodiment 9

Because the configuration of the vehicle control apparatus 100 represented in FIGS. 1 and 2 can directly be applied to a vehicle control apparatus 100 according to Embodiment 9, the vehicle control apparatus 100 according to Embodiment 9 will be explained by utilizing the reference numerals as they are. Although the vehicle control apparatus 100 according to Embodiment 9 can be realized only by changing software items, changing hardware items may be included.

<Decrease of Power-Source Remaining Capacity During Polling Interval>

In the software-updating continuation processing according to Embodiment 1, the vehicle control apparatus 100 according to Embodiment 9 monitors a decrease in the power-source remaining capacity, based on the polling interval. In the present embodiment, in the case where the polling period Tp is 30 seconds, polling is performed and then software-updating continuation processing is performed.

Figure 13:
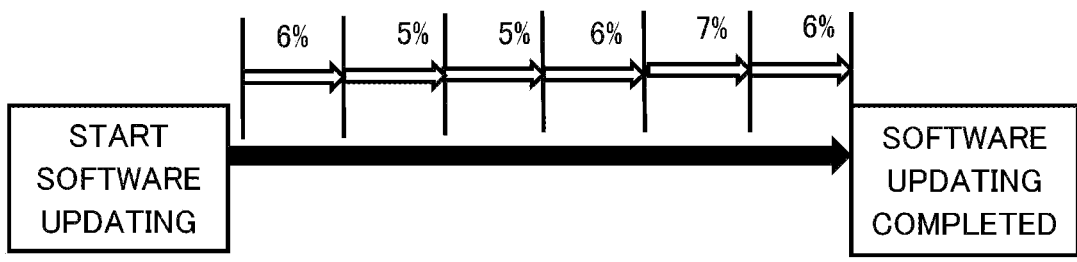
FIG. 13 is a first timing chart representing software updating in a vehicle control apparatus according to Embodiment 9.

FIG. 13 is a first timing chart representing software updating in the vehicle control apparatus 100 according to Embodiment 9. FIG. 13 represents the situation where polling is performed at 30-second intervals in 180 seconds. There is represented the state where in the case where the software-updating electric power EPrv corresponds to, for example, 30% of the power-source remaining capacity of the battery 20 at a time when the battery 20 has been fully charged, the software-updating electric power EPrv decreases by substantially 5% every polling interval.

In this situation, the expected power-source remaining capacity decreasing amount ΔEPr is 5% in each polling period Tp. Accordingly, it may be allowed that it is monitored whether or not the power-source remaining capacity decreasing amount ΔEPr exceeding, for example, 10%, which is a double of the foregoing decreasing amount, occurs, and in the case where the power-source remaining capacity decreasing amount ΔEPr exceeding 10% occurs, software updating is interrupted.

Figure 14:
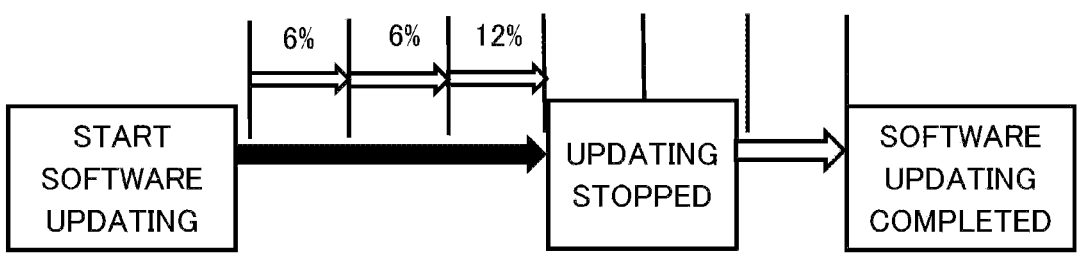
FIG. 14 is a second timing chart representing software updating in the vehicle control apparatus according to Embodiment 9.

FIG. 14 is a second timing chart representing software updating in the vehicle control apparatus 100 according to Embodiment 9. In FIG. 14, the power-source remaining capacity decreasing amount ΔEPr at the third polling is 12%. Because the power-source remaining capacity decreasing amount ΔEPr exceeding 10% has occurred, the software updating is interrupted at this timing.

In the present embodiment, in the case where in each polling period Tp, the power-source remaining capacity decreasing amount ΔEPr from the software-updating electric power EPrv exceeds the double of the expected value thereof, the software updating is interrupted; however, it is not necessary that the limit value is the double. It may be allowed that the determination value to be obtained by multiplying the expected value by a coefficient K is obtained through an experiment, a simulation, or the like.

<Software-Updating Continuation Processing>

Figure 15:
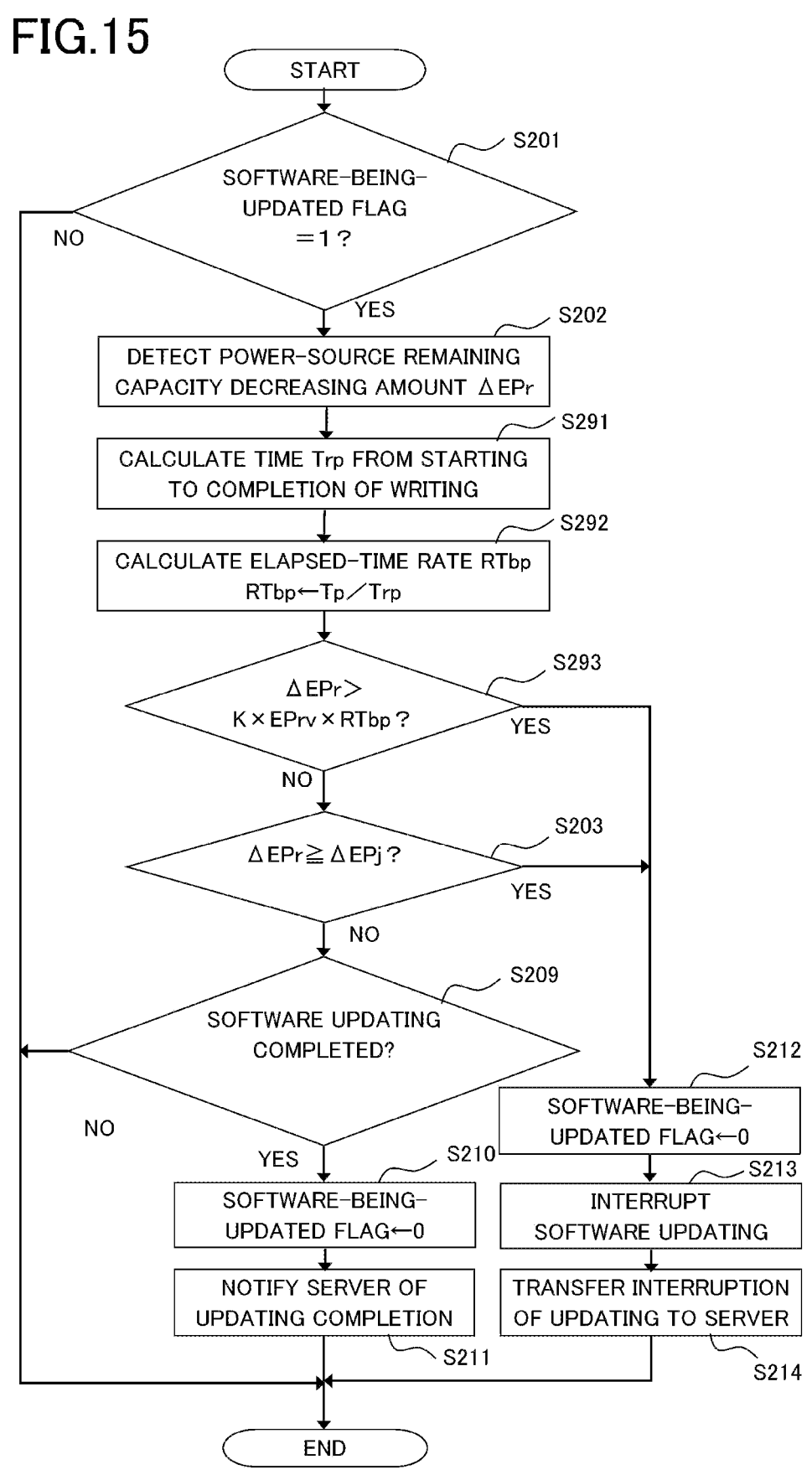
FIG. 15 is a flowchart representing software-updating continuation processing by the vehicle control apparatus according to Embodiment 9.

FIG. 15 is a flowchart representing software-updating continuation processing by the vehicle control apparatus according to Embodiment 9. The flowchart in FIG. 15 is different from the flowchart, in FIG. 4 according to Embodiment 1, representing software-updating continuation processing only in that the steps S291 through S293 are newly added between the steps S202 and S203. The added part will mainly be explained.

In the case where in the step S201 in FIG. 15, the software-being-updated flag has been set, the step S201 is followed by the step S202. In the step S202, the power-source-remaining-capacity decrease detection unit 16 detects the power-source remaining capacity decreasing amount ΔEPr. In the present embodiment, the power-source remaining capacity decreasing amount ΔEPr is defined as the difference between the power-source remaining capacity EPr obtained at each polling and the immediately previous value thereof.

In the step S291, a software updating time Trp from the start to the completion of software updating is calculated.

After that, in the step S292, an elapsed-time rate RTbp is calculated. The elapsed-time rate RTbp is the rate of the polling period Tp to the software updating time Trp.

In the step S293, it is determined whether or not the power-source remaining capacity decreasing amount ΔEPr is larger than the value obtained by multiplying the product of the software-updating electric power EPrv and the elapsed-time rate RTbp by the coefficient K. In the case where the power-source remaining capacity decreasing amount ΔEPr is larger than the foregoing value (the determination result is YES), it is suggested that the power-source remaining capacity decreasing amount ΔEPr in the polling interval is larger than the value obtained by multiplying the expected value by the coefficient K. Because it is determined that the power-source remaining capacity decreasing amount ΔEPr is larger than the expectation, the step S293 is followed by the step S212, where processing for interrupting software updating is performed.

In the case where in the step S293, the power-source remaining capacity decreasing amount ΔEPr is not larger than the foregoing value (the determination result is NO), the step S239 is followed by the step S203. In the step S203, it is determined whether or not the power-source remaining capacity decreasing amount ΔEPr is the same as or larger than the predetermined decrease determination value ΔEPj.

As described above, whether or not software updating can be continued is determined based on whether or not the power-source remaining capacity decreasing amount ΔEPr at each polling interval is larger than the value obtained by multiplying the expected value by the coefficient K. Accordingly, in comparison with the method of comparing an increase in the power-source remaining capacity decreasing amount ΔEPr with the decrease determination value ΔEPj, which is a fixed value, the foregoing method makes it possible to accurately make a determination. As a result, it is made possible to prevent the vehicle control apparatus 100 from abnormally operating and to perform high-stability software updating.

10. Embodiment 10

Because the configuration of the vehicle control apparatus 100 represented in FIGS. 1 and 2 can directly be applied to a vehicle control apparatus 100 according to Embodiment 10, the vehicle control apparatus 100 according to Embodiment 10 will be explained by utilizing the reference numerals they are. Although the vehicle control apparatus 100 according to Embodiment 10 can be realized only by changing software items, changing hardware items may be included.

<Calculation of Software-Reception Electric Power>

The vehicle control apparatus 100 according to Embodiment 10 performs software-updating-starting preprocessing as preprocessing for the software-updating starting processing according to Embodiment 1. Before receiving data for updating software from the server, the vehicle control apparatus 100 receives updating-software information, which is information on the updating software.

The updating-software information includes information such as the volume of the updating software. The vehicle control apparatus 100 calculates updating-software reception electric power EPrcv required for receiving data for updating-software main body. Then, the vehicle control apparatus 100 calculates the software-updating electric power EPrv for writing updating software in the storage apparatus 91.

Software reception updating electric power EPrcv_rv is the sum of the updating-software reception electric power EPrcv and the software-updating electric power EPrv. The vehicle control apparatus 100 calculates the Software reception updating electric power EPrcv_rv from the updating-software information received from the server; in the case where the power-source remaining larger than the software reception updating capacity EPr is electric power EPrcv_rv, the vehicle control apparatus 100 receives updating software from the server.

In the case where the power-source remaining capacity EPr is smaller than the software reception updating electric power EPrcv_rv, the vehicle control apparatus 100 answers its rejection receiving the updating-software data to the server. As of described above, before receiving the updating-software data, it can be determined, based on the power-source remaining capacity EPr, whether or not the software updating can be performed. Accordingly, it can be prevented that unnecessary updating software is received. As a result, consumption of the power-source remaining capacity EPr of the battery 20 can be saved. Moreover, high-stability software updating can be performed.

<Software-Updating-Starting Preprocessing>

Figure 16:
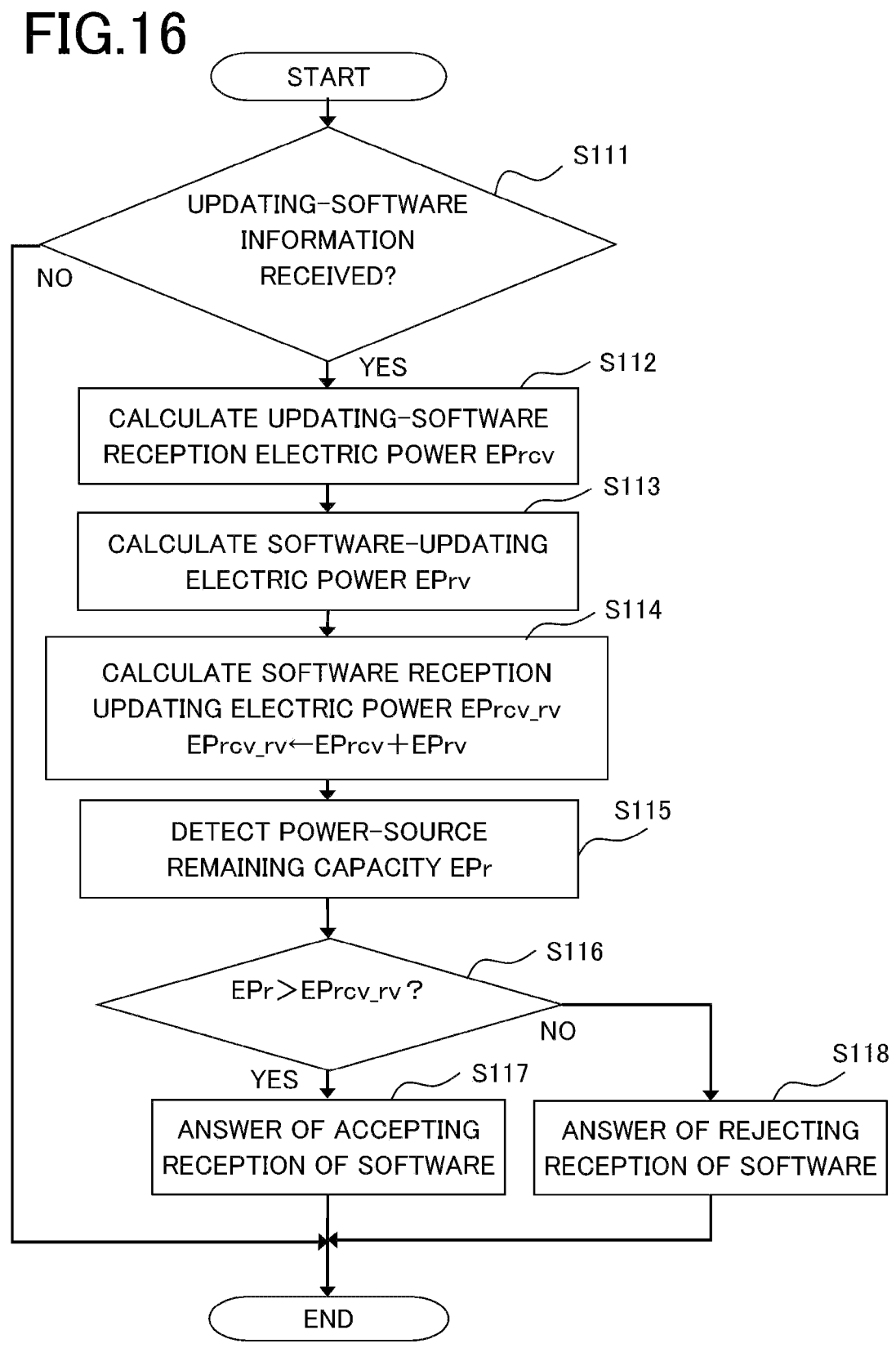
FIG. 16 is a flowchart representing software-updating-starting preprocessing by a vehicle control apparatus according to Embodiment 10.

FIG. 16 is a flowchart representing software-updating-starting preprocessing by the vehicle control apparatus according to Embodiment 10. FIG. 16 is a flowchart performed before the flowchart representing software-updating starting processing in FIG. 3 according to Embodiment 1.

The processing in the flowchart in FIG. 16 is performed every predetermined time (for example, every 10 ms). The processing represented in FIG. 16 may be performed not every predetermined time but every event, for example, each time the vehicle has traveled a predetermined distance or each time the vehicle control apparatus 100 has received data from the server.

After the processing is started, it is determined in the step S111 whether or not the reception unit 18 has received updating software from the server. In the case where the reception unit 18 has not received updating software (the determination result is NO), the processing is ended. In the case where the reception unit 18 has received updating software (the determination result is YES), the step S111 is followed by the step S112.

In the step S112, there is calculated the updating-software reception electric power EPrcv required for receiving data for updating-software main body, based on the updating-software information. In the step S113, the software-updating electric power EPrv for writing the updating software in the storage apparatus 91 is calculated.

The software reception updating electric power EPrcv_rv is calculated by adding the updating-software reception electric power EPrcv and the software-updating electric power EPrv. In the step S115, the power-source remaining capacity EPr is detected.

In the step S116, it is determined whether or not the power-source remaining capacity EPr is larger than the software reception updating electric power EPrcv_rv. In the case where the power-source remaining capacity EPr is the same as or smaller than the software reception updating electric power EPrcv_rv (the determination result is NO), the step S116 is followed by the step S118. In the step S118, the vehicle control apparatus 100 transmits its rejection of receiving the software to the server. Then, the foregoing processing is ended.

In the case where in the step S116, the power-source remaining capacity EPr is larger than the software reception updating electric power EPrcv_rv (the determination result is YES), the step S116 is followed by the step S117. In the step S117, the vehicle control apparatus 100 transmits its accepting answer of receiving the software to the server. Then, the foregoing processing is ended.

After receiving the reception-accepting answer from the vehicle control apparatus 100, the server starts to transmit the data for the updating-software main body to the vehicle control apparatus 100. After receiving the updating software, the vehicle control apparatus 100 starts the software-updating starting processing whose flowchart is represented in FIG. 3.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

The invention claimed is:

1. A vehicle control apparatus comprising:
a storage in which software has been written;
an interface configured to receive updating software for updating the software; and
processing circuitry configured to:
detect a power-source remaining capacity of a battery;
detect a power-source remaining capacity decreasing amount of the battery;
calculate a software-updating electric power for writing the updating software in the storage;
permit starting of updating the software in the case where the power-source remaining capacity of the battery is larger than the software-updating electric power;
permit continuation of updating the software in the case where the power-source remaining capacity decreasing amount of the battery is smaller than a predetermined decrease determination value;
start writing the updating software in the storage in the case where the starting of updating the software is permitted;
continue writing the updating software in the storage in the case where, during writing the updating software in the storage, the continuation of updating the software is permitted; and
interrupt writing the updating software in the storage in the case where starting of updating the software is not permitted or continuation of updating the software is not permitted.

2. The vehicle control apparatus according to claim 1, wherein the processing circuitry is configured to detect the power-source remaining capacity decreasing amount in accordance with at least one of a power-source voltage of the battery, a cold cranking ampere, or a battery-liquid specific gravity.

3. The vehicle control apparatus according to claim 1, wherein the processing circuitry is configured to calculate software-updating continuation power to be consumed before completion of writing during writing the updating software in the storage, wherein in the case where the power-source remaining capacity decreasing amount is smaller than the predetermined decrease determination value and larger than a predetermined second decrease determination value, the processing circuitry calculates a required power-source remaining capacity by increasing the software-updating continuation power at a predetermined decreasing-timing increasing rate, wherein in the case where the power-source remaining capacity decreasing amount is the same as or smaller than the second decrease determination value, the processing circuitry calculates the required power-source remaining capacity by increasing the software-updating continuation power in accordance with the power-source remaining capacity decreasing amount, and wherein in the case where the power-source remaining capacity of the battery is larger than the required power-source remaining capacity, the processing circuitry permits continuation of updating the software.

4. The vehicle control apparatus according to claim 3, wherein the processing circuitry is configured to detect the power-source remaining capacity decreasing amount in accordance with a power-source voltage of the battery, and wherein in the case where the power-source voltage of the battery is smaller than 11.5 V, the processing circuitry calculates the required power-source remaining capacity by increasing the software-updating continuation power by 100% thereof, and in the case where the power-source voltage of the battery is the same as or larger than 11.5 V and smaller than 12.5 V, the processing circuitry calculates the required power-source remaining capacity by increasing the software-updating continuation power by 5% thereof each time the power-source voltage of the battery decreases by 0.1 V from 12.5 V.

5. The vehicle control apparatus according to claim 3, wherein the processing circuitry is configured to detect the power-source remaining capacity decreasing amount in accordance with a cold cranking ampere of the battery, and wherein in the case where the cold cranking ampere is smaller than 70% of an initial cold cranking ampere of the battery, the processing circuitry calculates the required power-source remaining capacity by increasing the software-updating continuation power by 100% thereof, and in the case where the cold cranking ampere is the same as or larger than 70% of the initial cold cranking ampere of the battery and smaller than 100% of the initial cold cranking ampere of the battery, the processing circuitry calculates the required power-source remaining capacity by increasing the software-updating continuation power at a rate of a decreasing amount of the cold cranking ampere to 100% thereof.

6. The vehicle control apparatus according to claim 3, wherein the processing circuitry is configured to detect the power-source remaining capacity decreasing amount in accordance with a battery-liquid specific gravity of the battery, and wherein in the case where the battery-liquid specific gravity is smaller than 1.21, the processing circuitry calculates the required power-source remaining capacity by increasing the software-updating continuation power by 100% thereof, and in the case where the battery-liquid specific gravity is the same as or larger than 1.21 and smaller than 1.28, the processing circuitry calculates the required power-source remaining capacity by increasing the software-updating continuation power by 7% thereof each time the battery-liquid specific gravity decreases by 0.01 from 1.28.

7. The vehicle control apparatus according to claim 3, wherein in the case where the battery has been being utilized for 5 years or longer exceeding a usable years thereof, the processing circuitry calculates the required power-source remaining capacity by increasing the software-updating continuation power by 100% thereof.

8. The vehicle control apparatus according to claim 3, wherein in the case where the battery has two or more times of battery-exhaustion histories, the processing circuitry calculates the required power-source remaining capacity by increasing the software-updating continuation power by 100% thereof.

9. The vehicle control apparatus according to claim 3, wherein in the case where a vehicle has stopped continuously for one month or longer or has travelled a distance shorter than 2 km ten or more times, the processing circuitry calculates the required power-source remaining capacity by increasing the software-updating continuation power by 100% thereof.

10. The vehicle control apparatus according to claim 1, wherein in the case where the processing circuitry determines that starting of updating the software is permitted, the processing circuitry starts writing the updating software in the storage, and in the case where writing the updating software in the storage is completed within a predetermined writing completion time, the processing circuitry continues writing the updating software in the storage regardless of whether the power-source remaining capacity decreasing amount of the battery is smaller than the predetermined decrease determination value.

11. The vehicle control apparatus according to claim 10, wherein in the case where writing the updating software in the storage is completed within 2 minutes, the processing circuitry continues writing the updating software in the storage, regardless of whether the power-source remaining capacity decreasing amount of the battery is smaller than the predetermined decrease determination value.

12. The vehicle control apparatus according to claim 1, wherein in the case where the processing circuitry determines that starting of updating the software is permitted, the processing circuitry starts writing the updating software in the storage, and in the case where the power-source remaining capacity of the battery is larger than a sum of the software-updating electric power and a predetermined excessive electric power, the processing circuitry continues writing the updating software in the storage regardless of whether the power-source remaining capacity decreasing amount of the battery is smaller than the predetermined decrease determination value.

13. The vehicle control apparatus according to claim 12, wherein in the case where the power-source remaining capacity of the battery is larger than a sum of the software-updating electric power and 20% of an initial electric-power capacity of the battery, the processing circuitry continues writing the updating software in the storage regardless of whether the power-source remaining capacity decreasing amount of the battery is smaller than the predetermined decrease determination value.

14. The vehicle control apparatus according to claim 1, wherein the processing circuitry is configured to detect the power-source remaining capacity decreasing amount of the battery at a predetermined polling period, and wherein the processing circuitry is configured to calculate an elapsed-time rate, which is a rate of the polling period to a predetermined time from starting of writing the updating software in the storage to completion thereof, and in the case where the power-source remaining capacity decreasing amount in the polling period is larger than a value obtained by multiplying a product of the software-updating electric power and the elapsed-time rate by a predetermined coefficient, the processing circuitry determines that continuation of updating the software is not permitted.

15. The vehicle control apparatus according to claim 14, wherein in the case where the power-source remaining capacity decreasing amount in the polling period is larger than a double of the product of the software-updating electric power and the elapsed-time rate, the processing circuitry determines that continuation of updating the software is not permitted.

16. The vehicle control apparatus according to claim 1, wherein the interface is configured to receive updating-software information, which is information on the updating software, wherein the processing circuitry is configured to calculate updating-software reception electric power for receiving updating-software data, which is a main body of the updating software, based on the updating-software information, and calculate software reception updating electric power, which is a sum of the updating-software reception electric power and the software-updating electric power calculated based on the updating-software information, and wherein in the case where the power-source remaining capacity of the battery is larger than the software reception updating electric power, the interface receives the updating-software data, and in the case where the power-source remaining capacity of the battery is the same as or smaller than the software reception updating electric power, the interface rejects reception of the updating-software data.

* * * * *